United States Patent
Tan et al.

(10) Patent No.: US 11,218,314 B2
(45) Date of Patent: Jan. 4, 2022

(54) NETWORK FUNCTION SERVICE INVOCATION METHOD, APPARATUS, AND SYSTEM

(71) Applicant: Huawei Technologies Co., Ltd., Shenzhen (CN)

(72) Inventors: Shuaishuai Tan, Shenzhen (CN); Lu Gan, Shenzhen (CN); Bo Zhang, Shenzhen (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 16/566,018

(22) Filed: Sep. 10, 2019

(65) Prior Publication Data

US 2020/0007335 A1    Jan. 2, 2020

Related U.S. Application Data

(63) Continuation of application No. PCT/CN2018/093421, filed on Jun. 28, 2018.

(30) Foreign Application Priority Data

Sep. 28, 2017   (CN) .................... 201710897850.X

(51) Int. Cl.
*H04L 29/06* (2006.01)
*H04L 9/32* (2006.01)

(52) U.S. Cl.
CPC .......... *H04L 9/3213* (2013.01); *H04L 9/3247* (2013.01); *H04L 63/10* (2013.01)

(58) Field of Classification Search
None
See application file for complete search history.

(56) References Cited

U.S. PATENT DOCUMENTS 9,686,257 B2   6/2017   Tamura
9,699,167 B1   7/2017   Tovino et al.
(Continued)

FOREIGN PATENT DOCUMENTS

CN   103916395 A   7/2014
CN   104022875 A   9/2014
(Continued)

OTHER PUBLICATIONS

3GPP TR 33.899, V1.3.0, "3rd Generation Partnership Project; Technical Specification Group Services and System Aspects; Study on the security aspects of the next generation system (Release 14)," XP051336126, Aug. 21, 2017, 5 pages.

(Continued)

*Primary Examiner* — Andrew J Steinle

(74) *Attorney, Agent, or Firm* — Conley Rose, P.C.

(57) ABSTRACT

A network function service invocation method includes sending, by a first network function network element, a first request message to an authorization network element, wherein the first request message is used to request permission to invoke a first network function service provided by a second network function network element, performing, by the authorization network element, identity authentication on the first network function network element; generating, by the authorization network element, a token when determining that the identity authentication succeeds, wherein the token is used to indicate that the first network function network element has the permission to invoke the first network function service of the second network function (Continued)

network element, and sending, by the authorization network element, a token to the first network function network element.

20 Claims, 7 Drawing Sheets

(56) References Cited

U.S. PATENT DOCUMENTS

| | | | | |
|---|---|---|---|---|
| 2014/0086177 | A1* | 3/2014 | Adjakple | H04L 67/10 370/329 |
| 2015/0063166 | A1* | 3/2015 | Sif | G06F 9/45558 370/254 |
| 2016/0006743 | A1 | 1/2016 | Liu | |
| 2020/0059976 | A1* | 2/2020 | Bhatia | H04W 8/005 |
| 2021/0144517 | A1* | 5/2021 | Guim Bernat | G06F 11/3006 |

FOREIGN PATENT DOCUMENTS

| | | |
|---|---|---|
| CN | 102638473 B | 12/2014 |
| CN | 104917721 A | 9/2015 |
| CN | 105262780 A | 1/2016 |
| CN | 105763547 A | 7/2016 |

OTHER PUBLICATIONS

3GPP TS 23.501, V1.2.0, "3rd Generation Partnership Project; Technical Specification Group Services and System Aspects; System Architecture for the 5G System; Stage 2 (Release 15)," Jul. 2017, 166 pages.

3GPP TS 23.502, V0.6.0, "3rd Generation Partnership Project; Technical Specification Group Services and System Aspects; Procedures for the 5G System; Stage 2 (Release 15)," Aug. 2017, 148 pages.

3GPP TS 33.501, V0.3.0, "3rd Generation Partnership Project; Technical Specification Group Services and System Aspects; Security Architecture and Procedures for 5G System (Release 15)," Aug. 2017, 44 pages.

Yifeng, R., "Understanding OAuth 2.0," Blog, May 12, 2014, with an English machine translation, 29 pages.

Hardt, D., Ed., et al., "The OAuth 2.0 Authorization Framework," RFC 6749, Oct. 2012, 76 pages.

Jones, M., "JSON Web Token (JWT)," RFC 7519, May 2015, 30 pages.

Huawei et al., "A security solution for service based architecture," 3GPP DRAFT TSG SA WG3 (Security) Meeting #88, S3-171875, Aug. 6, 2017, XP051310985, 2 pages.

\* cited by examiner

Identifier of a token: 8927234
Algorithm: HMAC-SHA256

Type of a network function module requesting to invoke a network function service: AMF
Identifier of the network function module requesting to invoke a network function service: amf0.5gc.mnc000.mcc460.3gppnetwork.org
Type of a network function module providing a network function service: AUSF
Identifier of the network function module providing a network function service: ausf1.5gc.mnc000.mcc460.3gppnetwork.org
Network function service list: $N_{AUSF}$_UE Authentication Identifier of an operator: as0.5gc.mnc000.mcc460.3gppnetwork.org
Identifier of an authorization module: nrf0.5gc.mnc000.mcc460.3gppnetwork.org
Effective time of the token: 20170101123821
Failure time of the token: 20170201144051

Message verification code: JFOWIUHUEWR3B45B415471ACA13B7F3DC509E8FE65D691IE94ADCC365D

FIG. 3

| Identifier of a network function module | Identifier of a network function module requesting to invoke the network function service |
|---|---|
| User authentication ($N_{AUSF\_UE}$ Authentication) | amf0.5gc.mnc000.mcc460.3gppnetwork.org |
| | af0.5gc.mnc000.mcc460.3gppnetwork.org |
| | nef1.5gc.mnc000.mcc460.3gppnetwork.org |
| | ... |

NETWORK FUNCTION SERVICE INVOCATION METHOD, APPARATUS, AND SYSTEM

CROSS-REFERENCE TO RELATED APPLICATIONS

This application is a continuation of International Patent Application No. PCT/CN2018/093421 filed on Jun. 28, 2018, which claims priority to Chinese Patent Application No. 201710897850.X filed on Sep. 28, 2017. The disclosures of the aforementioned applications are hereby incorporated by reference in their entireties.

TECHNICAL FIELD

This application relates to the communications field, and more specifically, to a network function service invocation method, apparatus, and system in the communications field.

BACKGROUND

With continuous development of communications systems, a service based architecture (SBA) is widely applied. In the service based architecture, a network entity that can provide a specific network function is referred to as a network function module, and a network function may be provided as a service.

In the service based architecture, any two network function modules may interact with each other by invoking a network function service through a service based interface. Because protocol stacks for all service based interfaces are the same, to be specific, a network function service provided by a network function module with a service based interface may be invoked by any other network function module, there is a threat of network function service abuse, and security performance is relatively poor.

Therefore, a solution needs to be provided to resolve a problem of relatively poor security performance that exists when a network function service is invoked in the service based architecture.

SUMMARY

This application provides a network function service invocation method, apparatus, and system, to improve security of invoking a network function service.

According to a first aspect, this application provides a network function service invocation method. The method includes receiving, by an authorization module, a first request message sent by a first network function module, where the first request message is used to request a permission to invoke a first network function service provided by a second network function module, the first request message carries first information, second information, and third information, the first information is used to indicate the first network function module, the second information is used to indicate the second network function module, and the third information is used to indicate the first network function service; determining, by the authorization module based on the first information, the second information, and the third information, whether the first network function module has the permission to invoke the first network function service; and sending, by the authorization module, a token to the first network function module when determining that the first network function module has the permission to invoke the first network function service, where the token is used to indicate that the first network function module has the permission to invoke the first network function service of the second network function module.

It should be understood that, a network function module in this embodiment of this application has a particular function and a network interface, and may be a network element on dedicated hardware, a software instance that runs on dedicated hardware, or a virtual function instance on a related platform (for example, a cloud infrastructure). This is not limited in this embodiment of this application.

According to the network function service invocation method provided in this embodiment of this application, when the authorization module determines that the first network function module has the permission to invoke the first network function service provided by the second network function module, the authorization module sends the token to the first network function module, where the token is used to indicate that the first network function module has the permission to invoke the first network function service, so that the first network function module uses the token to invoke the first network function service provided by the second network function module, thereby improving security of invoking a network function service.

Optionally, before the sending, by the authorization module, a token to the first network function module when determining that the first network function module has the permission to invoke the first network function service, the method further includes generating, by the authorization module, the token.

It should be understood that, the first network function module can provide at least one network function service, the second network function module can provide at least one network function service, and the at least one network function service provided by the first network function module is different from the at least one network function service provided by the second network function module.

Optionally, the first information may include a type and/or an identifier of the first network function module, the second information may include a type and/or an identifier of the second network function module, and the third information may include an identifier of the first network function service. This is not limited in this embodiment of this application.

Optionally, a type of the network function module in this embodiment of this application may include an access and mobility management function, a session management function, a network function data repository function, a network exposure function, an application function, or the like. This is not limited in this embodiment of this application.

Optionally, an identifier of the network function module in this embodiment of this application may include a name, an identifier, a serial number, a domain name, a network access identifier, a network protocol address, or the like. This is not limited in this embodiment of this application.

Optionally, an identifier of the network function service in this embodiment of this application may include a name, an identifier, a serial number, or the like of the network function service. This is not limited in this embodiment of this application.

In an optional embodiment, the authorization module may determine, based on the type of the first network function module, the type of the second network function module, the identifier of the first network function service, and preconfigured first authorization information, whether the first network function module has the permission to invoke the first network function service. The first authorization information is used to indicate at least one type of network function module that is allowed to invoke the first network function service.

Optionally, the first authorization information may include the at least one type of network function module that is allowed to invoke the first network function service.

In another optional embodiment, the authorization module may determine, based on the identifier of the first network function module, the identifier of the second network function, the identifier of the first network function service, and pre-configured second authorization information, whether to grant the permission to invoke the first network function service. The second authorization information is used to indicate at least one network function module that is allowed to invoke the first network function service.

Optionally, the second authorization information may include an identifier of each of the at least one network function module that is allowed to invoke the first network function service.

In still another optional embodiment, the authorization module may determine, based on the type of the first network function module, the identifier of the first network function module, the type of the second network function module, the identifier of the second network function module, and pre-configured third authorization information, whether the first network function module has the permission to invoke the first network function service. The third authorization information is used to indicate at least one type of network function module that is allowed to invoke the first network function service and at least one network function module corresponding to each of the at least one type.

Optionally, the third authorization information may include the at least one type of network function module that is allowed to invoke the first network function service and an identifier of each of the at least one network function module corresponding to each type.

Optionally, the first request message may further carry at least one of an identifier of a network slice to which the first network function module belongs, an identifier of an operator providing a service for the first network function module, and a service request parameter of the first network function module. This is not limited in this embodiment of this application.

It should be understood that, the network slice may be understood as a logical network that can provide a particular network capability and network characteristic, and one network slice may include a plurality of network function modules.

Optionally, the identifier of the network slice in this embodiment of this application may be a name, a domain name, an identifier, a serial number, and the like of the network slice, and the identifier of the operator may be a public land mobile network identifier, a name, a serial number, and the like. This is not limited in this embodiment of this application.

In a possible implementation, the token carries fourth information, fifth information, and sixth information, the fourth information is used to indicate that a network function module requesting to invoke a network function service is the first network function module, the fifth information is used to indicate that a network function module providing a network function service is the second network function module, the sixth information is used to indicate at least one network function service that the first network function module has a permission to invoke and that is provided by the second network function module, and the at least one network function service includes the first network function service.

Optionally, the fourth information may include a type and/or an identifier of the network function module requesting to invoke a network function service, the fifth information may include a type and/or an identifier of the network function module providing a network function service, and the sixth information may include an identifier of each of the at least one network function service. This is not limited in this embodiment of this application.

Optionally, the token may further carry an identifier of the token, a message verification code (a digital signature), and an algorithm for the message verification code (the digital signature).

Optionally, the token may further carry a validity period or at least one of an effective time and a failure time of the token. When the token carries the effective time or the failure time, the token may further carry validity duration.

Optionally, the token may further carry the identifier of the operator or an identifier of the authorization module issuing the token. This is not limited in this embodiment of this application.

It should be understood that, the first network function module may have different permissions when invoking the first network function service to provide a service for different user equipment. Because the authorization module stores no authorization policy related to the user equipment, a network architecture provided in this embodiment of this application may further include a user data management module, and the authorization module may request, from the user data management module, an authorization policy of the first network function service corresponding to the user equipment.

In a possible implementation, the first network function service serves user equipment, and the method further includes sending, by the authorization module, a second request message to a user data management module, where the second request message is used to request an authorization policy of the first network function service corresponding to the user equipment, the second request message carries an identifier of the user equipment, and the authorization policy is used to indicate whether to grant, to the first network function module, the permission to invoke the first network function service corresponding to the user equipment; and receiving, by the authorization module, the authorization policy sent by the user data management module based on the identifier of the user equipment; and the determining, by the authorization module based on the first information, the second information, and the third information, whether the first network function module has the permission to invoke the first network function service includes determining, by the authorization module based on the first information, the second information, the third information, and the authorization policy, whether the first network function module has the permission to invoke the first network function service.

Optionally, the user data management module may pre-configure an authorization policy or an authorization rule of at least one network function service corresponding to each of at least one user equipment in a network. This is not limited in this embodiment of this application.

In a possible implementation, the method further includes sending, by the authorization module, seventh information to the second network function module, where the seventh information includes an identifier of at least one token that has been revoked.

According to the network function service invocation method provided in this embodiment of this application, the authorization module indicates the at least one token that has been revoked to the second network function module, so that the second network function module can confirm validity of the token, without a need to send the token to the authorization module for confirmation each time, thereby reducing signaling overheads.

In a possible implementation, the token further carries an identifier of the token, and the method further includes receiving, by the authorization module, a third request message sent by the second network function module, where the third request message carries the token; verifying, by the authorization module, validity of the token based on the identifier of the token, to obtain a verification result; and sending, by the authorization module, the verification result to the second network function module.

According to the network function service invocation method provided in this embodiment of this application, the second network function module sends the to-be-verified token to the authorization module, and requests the authorization module to verify the validity of the token, thereby reducing complexity of authenticating the token by the second network function module.

According to a second aspect, this application provides a network function service invocation method. The method includes sending, by a first network function module, a fourth request message to a second network function module, where the fourth request message is used to request to invoke a first network function service provided by the second network function module, the fourth request message carries first information, second information, third information, and a token, the first information is used to indicate the first network function module, the second information is used to indicate the second network function module, the third information is used to indicate the first network function service, and the token is used to indicate that the first network function module has a permission to invoke the first network function service of the second network function module; and receiving, by the first network function module, a service response message that is of the first network function service and that is sent by the second network function module, where the service response message is sent based on the first information, the second information, the third information, and the token.

It should be understood that, a network function module in this embodiment of this application has a particular function and a network interface, and may be a network element on dedicated hardware, a software instance that runs on dedicated hardware, or a virtual function instance on a related platform (for example, a cloud infrastructure). This is not limited in this embodiment of this application.

In a possible implementation, the token carries fourth information, fifth information, and sixth information, where the fourth information is used to indicate a network function module requesting to invoke a network function service, the fifth information is used to indicate a network function module providing a network function service, and the sixth information is used to indicate at least one network function service that the first network function module has a permission to invoke and that is provided by the second network function module.

In a possible implementation, before the sending, by a first network function module, a fourth request message to a second network function module, the method further includes sending, by the first network function module, a first request message to an authorization module, where the first request message is used to request the permission to invoke the first network function service, and the first request message carries the first information, the second information, and the third information; and receiving, by the first network function module, the token sent by the authorization module, where the token is sent based on the first information, the second information, and the third information.

It should be understood that, the token in this embodiment of this application may be repeatedly used within a validity period, without a need to obtain the token each time when a network function service is requested, thereby reducing signaling overheads. A start time of the validity period may be an effective time of the token, and an end time of the validity period may be a failure time of the token. This is not limited in this embodiment of this application.

It should further be understood that, the token in this embodiment of this application carries the sixth information, where the sixth information is used to indicate the at least one network function service that is authorized. When the first network function module requests any one of the at least one network function service, there is no need to request the token from the authorization module again, thereby further reducing signaling overheads.

For example, when the at least one network function service indicated by the sixth information includes a second network function service provided by the second network function module, the first network function module may further use the token to invoke the second network function service.

For another example, within the validity period, the first network function module may use the token for a plurality of times to invoke the at least one network function service that is authorized.

According to a third aspect, this application provides a network function service invocation method. The method includes receiving, by a second network function module, a fourth request message sent by a first network function module, where the fourth request message is used to request to invoke a first network function service provided by the second network function module, the fourth request message carries first information, second information, third information, and a token, the first information is used to indicate the first network function module, the second information is used to indicate the second network function module, the third information is used to indicate the first network function service, the token carries fourth information, fifth information, and sixth information, the fourth information is used to indicate a network function module requesting to invoke a network function service, the fifth information is used to indicate a network function module providing a network function service, and the sixth information is used to indicate at least one network function service that the first network function module has a permission to invoke and that is provided by the second network function module; determining, by the second network function module, whether the network function module indicated by the fourth information is the same as the first network function module, whether the network function module indicated by the fifth information is the same as the second network function module, and whether the at least one network function service indicated by the sixth information includes the first network function service; and sending, by the second network function module, a service response message of the first network function service to the first network function module when determining that the network function module indicated by the fourth information is the same as the first network function module, that the network function module indicated by the fifth information is the same as the second network function module, and that the at least one network function service indicated by the sixth information includes the first network function service.

According to the network function service invocation method provided in this embodiment of this application, the second network function module matches information in the fourth request message sent by the first network function module with information in the token, and when the matching is successful, sends the service response message to the first network function module, thereby improving security of invoking a network function service.

Specifically, the second network function module may match the information in the fourth request message with the information in the token, to be specific, match the first information in the fourth request message with the fourth information in the token, match the second information in the fourth request message with the fifth information in the token, and match the third information in the fourth request message with the sixth information in the token, to obtain a matching result.

Optionally, the first information may include a type and/or an identifier of the first network function module, the second information may include a type and/or an identifier of the second network function module, and the third information may include an identifier of the first network function service. This is not limited in this embodiment of this application.

Optionally, the fourth information may include a type and/or an identifier of the network function module requesting to invoke a network function service, the fifth information may include a type and/or an identifier of the network function module providing a network function service, and the sixth information may include an identifier of each of the at least one network function service. This is not limited in this embodiment of this application.

Optionally, a type of a network function module in this embodiment of this application may include an access and mobility management function, a session management function, a network function data repository function, a network exposure function, an application function, or the like. This is not limited in this embodiment of this application.

Optionally, an identifier of the network function module in this embodiment of this application may include a name, an identifier, a serial number, a domain name, a network access identifier, a network protocol address, or the like. This is not limited in this embodiment of this application.

Optionally, an identifier of the network function service in this embodiment of this application may include a name, an ID, a serial number, or the like of the network function service. This is not limited in this embodiment of this application.

In a possible implementation, the token further carries an identifier of the token, and the method further includes sending, by the second network function module, a third request message to the authorization module, where the third request message carries the token, and the authorization module may verify validity of the token based on the identifier of the token and an identifier of at least one locally stored token that has been revoked, to obtain a first verification result; and send the first verification result to the second network function module; and the sending, by the second network function module, a service response message of the first network function service to the first network function module when determining that the network function module indicated by the fourth information is the same as the first network function module, that the network function module indicated by the fifth information is the same as the second network function module, and that the at least one network function service indicated by the sixth information includes the first network function service includes sending, by the second network function module, the service response message of the first network function service to the first network function module when determining that the first verification result is validity, that the network function module requesting authorization is the same as the first network function module, that the network function module that is authorized is the same as the second network function module, and that the at least one network function service that is authorized includes the first network function service.

In a possible implementation, the token further carries an identifier of the token, and the method further includes receiving, by the second network function module, seventh information sent by the authorization module, where the seventh information includes an identifier of at least one token that has been revoked; and determining whether the identifier of the at least one token includes the identifier of the token; and the sending, by the second network function module, a service response message of the first network function service to the first network function module when determining that the network function module indicated by the fourth information is the same as the first network function module, that the network function module indicated by the fifth information is the same as the second network function module, and that the at least one network function service indicated by the sixth information includes the first network function service includes sending, by the second network function module, the service response message of the first network function service to the first network function module when determining that the identifier of the at least one token does not include the identifier of the token, that the network function module indicated by the fourth information is the same as the first network function module, that the network function module indicated by the fifth information is the same as the second network function module, and that the at least one network function service indicated by the sixth information includes the first network function service.

Optionally, the authorization module may periodically send the seventh information to the second network function module, or the authorization module may send the seventh information to the second network function module based on a request of the second network function module. This is not limited in this embodiment of this application.

According to the network function service invocation method provided in this embodiment of this application, the authorization module or the second network function module determines, based on whether the identifier of the at least one token that has been revoked includes the identifier of the token used to invoke the first network function service, whether the token has been revoked. This can prevent an invalid token that has been revoked from being used to invoke a network function service, thereby improving security of invoking the network function service.

In addition, the authorization module indicates the at least one token that has been revoked to the second network function module, so that the second network function module can confirm the validity of the token, without a need to send the token to the authorization module for confirmation each time, thereby reducing signaling overheads.

Optionally, the token may further carry at least one of a message verification code and a digital signature.

In a possible implementation, the method further includes verifying, by the second network function module, the message verification code and/or the digital signature, to obtain a second verification result, where the second verification result may indicate a success or a failure; and the sending, by the second network function module, the service response message of the first network function service to the first network function module when determining that the network function module requesting authorization is the same as the first network function module, that the network function module that is authorized is the same as the second network function module, and that the at least one network function service that is authorized includes the first network function service includes sending, by the second network function module, the service response message of the first network function service to the first network function module when determining that the second verification result indicates a success, that the network function module requesting authorization is the same as the first network function module, that the network function module that is authorized is the same as the second network function module, and that the at least one network function service that is authorized includes the first network function service.

Optionally, the token further carries a validity period or at least one of an effective time and a failure time of the token. When the token carries the effective time or the failure time, the token may further carry validity duration.

For example, the validity period of the token may be represented by the effective time plus the failure time, or the effective time plus the validity duration.

In an optional embodiment, the second network function module may verify the validity period of the token based on the validity period or at least one of the effective time and the failure time of the token, to obtain a third verification result, where the third verification result may be validity or invalidity. The second network function module sends the service response message of the first network function service to the first network function module when determining that the third verification result is validity, that the network function module requesting authorization is the same as the first network function module, that the network function module that is authorized is the same as the second network function module, and that the at least one network function service that is authorized includes the first network function service.

According to the network function service invocation method provided in this embodiment of this application, the second network function module verifies, based on the validity period or at least one of the effective time and the failure time of the token that is in the token, whether the token is valid. This can prevent an expired invalid token from being used to invoke a network function service, thereby improving security of invoking the network function service.

According to a fourth aspect, this application provides a network function service invocation system. The system includes a first network function module, a second network function module, and an authorization module, where the first network function module is configured to send a first request message to the authorization module, where the first request message is used to request a permission to invoke a first network function service provided by the second network function module, the first request message carries first information, second information, and third information, the first information is used to indicate the first network function module, the second information is used to indicate the second network function module, and the third information is used to indicate the first network function service; the authorization module is configured to receive the first request message sent by the first network function module; determine, based on the first information, the second information, and the third information, whether the first network function module has the permission to invoke the first network function service; and send a token to the first network function module when determining that the first network function module has the permission to invoke the first network function service, where the token carries fourth information, fifth information, and sixth information, the fourth information is used to indicate that a network function module requesting to invoke a network function service is the first network function module, the fifth information is used to indicate that a network function module providing a network function service is the second network function module, the sixth information is used to indicate at least one network function service that the first network function module has a permission to invoke and that is provided by the second network function module, and the at least one network function service includes the first network function service; the first network function module is further configured to receive the token sent by the authorization module; and send a fourth request message to the second network function module, where the fourth request message is used to request to invoke the first network function service, and the fourth request message carries the first information, the second information, the third information, and the token; the second network function module is configured to receive the fourth request message sent by the first network function module; determine whether the network function module indicated by the fourth information is the same as the first network function module, whether the network function module indicated by the fifth information is the same as the second network function module, and whether the at least one network function service indicated by the sixth information includes the first network function service; and send a service response message of the first network function service to the first network function module when determining that the network function module indicated by the fourth information is the same as the first network function module, that the network function module indicated by the fifth information is the same as the second network function module, and that the at least one network function service indicated by the sixth information includes the first network function service; and the first network function module is further configured to receive the service response message sent by the second network function module.

In a possible implementation, the first network function service serves user equipment, and the system further includes a user data management module, where the authorization module is further configured to send a second request message to the user data management module, where the second request message is used to request an authorization policy of the first network function service corresponding to the user equipment, the second request message carries an identifier of the user equipment, and the authorization policy is used to indicate whether to grant, to the first network function module, the permission to invoke the first network function service corresponding to the user equipment; the user data management module is configured to receive the second request message sent by the authorization module; determine, based on the identifier of the user equipment, the authorization policy of the first network function service corresponding to the user equipment; and send the authorization policy to the authorization module; and the authorization module is specifically configured to receive the authorization policy sent by the user data management module based on the identifier of the user equipment; and determine, based on the first information, the second information, the third information, and the authorization policy, whether the first network function module has the permission to invoke the first network function service.

In a possible implementation, the token further carries an identifier of the token; the authorization module is further configured to send seventh information to the second network function module, where the seventh information includes an identifier of at least one token that has been revoked; and the second network function module is specifically configured to receive the seventh information sent by the authorization module; determine whether the at least one token includes the token; and send the service response message of the first network function service to the first network function module when determining that the at least one token does not include the token, that the network function module indicated by the fourth information is the same as the first network function module, that the network function module indicated by the fifth information is the same as the second network function module, and that the at least one network function service indicated by the sixth information includes the first network function service.

In a possible implementation, the token further carries an identifier of the token, and the second network function module is further configured to send a third request message to the authorization module, where the third request message is used to request to verify validity of the token, and the third request message carries the token; the authorization module is further configured to receive the third request message sent by the second network function module; verify validity of the token based on the identifier of the token, to obtain a verification result; and send the verification result to the second network function module; and the second network function module is specifically configured to send the service response message of the first network function service to the first network function module when determining that the verification result is validity, that the network function module indicated by the fourth information is the same as the first network function module, that the network function module indicated by the fifth information is the same as the second network function module, and that the at least one network function service indicated by the sixth information includes the first network function service.

According to a fifth aspect, this application provides a network function service v system. The system includes a first network function module, a second network function module, and an authorization module, where the first network function module is configured to send a first request message to the second network function module, where the first request message is used to request to invoke a first network function service provided by the second network function module, the first request message carries first information, second information, and third information, the first information is used to indicate the first network function module, the second information is used to indicate the second network function module, and the third information is used to indicate the first network function service; the second network function module is configured to receive the first request message sent by the first network function module; and send a second request message to the authorization module based on the first information, the second information, and the third information, where the second request message is used to request to verify a permission of the first network function module to invoke the first network function service, and the second request message carries the first information, the second information, and the third information; the authorization module is configured to receive the second request message sent by the second network function module; verify, based on the first information, the second information, and the third information, whether the first network function module has the permission to invoke the first network function service, to obtain a verification result, where the verification result includes that the first network function module has the permission to invoke the first network function service or that the first network function module does not have the permission to invoke the first network function service; and send the verification result to the second network function module; the second network function module is further configured to receive the verification result sent by the authorization module; and send a service response message of the first network function service to the first network function module when the verification result is that the first network function module has the permission to invoke the first network function service; and the first network function module is further configured to receive the service response message sent by the second network function module.

According to a sixth aspect, this application provides a network function service invocation apparatus configured to perform the method according to the first aspect or any possible implementation of the first aspect.

According to a seventh aspect, this application provides a network function service invocation apparatus configured to perform the method according to the second aspect or any possible implementation of the second aspect.

According to an eighth aspect, this application provides a network function service invocation apparatus configured to perform the method according to the third aspect or any possible implementation of the third aspect.

According to a ninth aspect, this application provides a network function service invocation apparatus. The apparatus includes a memory, a processor, a transceiver, and a computer program that is stored in the memory and that may run on the processor. When executing the computer program, the processor performs the method according to the first aspect or any possible implementation of the first aspect.

According to a tenth aspect, this application provides a network function service invocation apparatus. The apparatus includes a memory, a processor, a transceiver, and a computer program that is stored in the memory and that may run on the processor. When executing the computer program, the processor performs the method according to the second aspect or any possible implementation of the second aspect.

According to an eleventh aspect, this application provides a network function service invocation apparatus. The apparatus includes a memory, a processor, a transceiver, and a computer program that is stored in the memory and that may run on the processor. When executing the computer program, the processor performs the method according to the third aspect or any possible implementation of the third aspect.

According to a twelfth aspect, this application provides a computer readable medium configured to store a computer program. The computer program includes an instruction used to perform the method according to the first aspect or any possible implementation of the first aspect.

According to a thirteenth aspect, this application provides a computer readable medium configured to store a computer program. The computer program includes an instruction used to perform the method according to the second aspect or any possible implementation of the second aspect.

According to a fourteenth aspect, this application provides a computer readable medium configured to store a computer program. The computer program includes an instruction used to perform the method according to the third aspect or any possible implementation of the third aspect.

According to a fifteenth aspect, this application provides a computer program product including an instruction. When the computer program product runs on a computer, the computer performs the method according to the first aspect or any possible implementation of the first aspect.

According to a sixteenth aspect, this application provides a computer program product including an instruction. When the computer program product runs on a computer, the computer performs the method according to the second aspect or any possible implementation of the second aspect.

According to a seventeenth aspect, this application provides a computer program product including an instruction. When the computer program product runs on a computer, the computer performs the method according to the third aspect or any possible implementation of the third aspect.

According to an eighteenth aspect, this application provides a chip, including an input interface, an output interface, at least one processor, and a memory. The input interface, the output interface, the processor, and the memory are connected using a bus. The processor is configured to execute code in the memory. When the code is executed, the processor is configured to perform the method according to the first aspect or any possible implementation of the first aspect.

According to a nineteenth aspect, this application provides a chip, including an input interface, an output interface, at least one processor, and a memory. The input interface, the output interface, the processor, and the memory are connected using a bus. The processor is configured to execute code in the memory. When the code is executed, the processor is configured to perform the method according to the second aspect or any possible implementation of the second aspect.

According to a twentieth aspect, this application provides a chip, including an input interface, an output interface, at least one processor, and a memory. The input interface, the output interface, the processor, and the memory are connected using a bus. The processor is configured to execute code in the memory. When the code is executed, the processor is configured to perform the method according to the third aspect or any possible implementation of the third aspect.

BRIEF DESCRIPTION OF DRAWINGS

FIG. 3 is a schematic diagram of a format of a token according to an embodiment of this application;

DESCRIPTION OF EMBODIMENTS

The following describes technical solutions of this application with reference to accompanying drawings.

Figure 1:
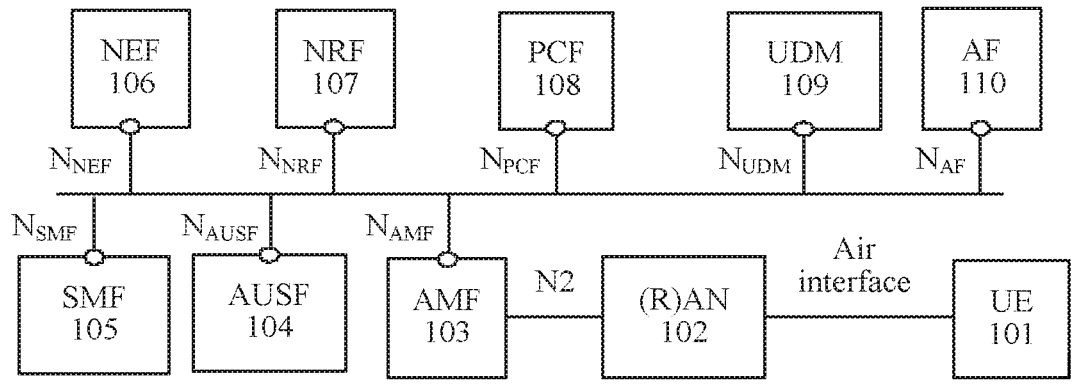
FIG. 1 is a schematic block diagram of a service based architecture according to an embodiment of this application.

FIG. 1 is a schematic block diagram of a service based architecture according to an embodiment of this application. The network architecture is based on a service, to obtain a plurality of different types of network function modules. The network function modules interact with each other by invoking a network function service through a service based interface.

It should be understood that, the network function module in this embodiment of this application has a particular function and a network interface, and may be a network element on dedicated hardware, a software instance that runs on dedicated hardware, or a virtual function instance on a related platform (for example, a cloud infrastructure). This is not limited in this embodiment of this application.

The following describes various modules in the service based architecture with reference to FIG. 1.

A radio access network (RAN) module 102 is responsible for access of user equipment (UE) 101. It may be understood that, in an actual expression process, a RAN may also be abbreviated as an AN.

Optionally, the UE in this embodiment of this application may be mobile or fixed. The UE may be an access terminal, a terminal device, a mobile terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, or user equipment in a future 5th generation (5G) system or a new radio (NR) system.

An access and mobility management function (AMF) module 103 has a function similar to mobility management in an existing mobile management entity (MME), and is configured to control access of the UE to a network resource and manage movement of the UE. The AMF module 103 communicates with the RAN module 102, to process an access network control plane, where N2 is not a service based interface.

An authentication server function (AUSF) module 104 is responsible for generation of a key and mutual authentication with the UE 101.

A session management function (SW) module 105 is responsible for managing a session of the UE, including session establishment, modification, and release.

A network exposure function (NEF) module 106 is responsible for securely providing a network function service in a core network for an external network entity service, conversion between internal information and external information, and so on.

A network function data repository function (NRF) module 107 is responsible for functions such as service discovery.

A policy control function (PCF) module 108 is responsible for managing a unified policy framework of network behavior, providing a policy rule for a control plane for execution, and so on.

A unified data management (UDM) module 109 includes a front end (front end, FE) and a user data repository (UDR). The FE is responsible for functions such as credit rating processing, location management, and subscription management, and may access user subscription data stored in the LTDR. The UDR is a user subscription data storage server, and is responsible for providing user subscription data for the front end.

An application function (AF) module 110 provides an application service.

As shown in FIG. 1, the AMF module 103 has a service based interface $N_{AMF}$, the SMF module 105 has a service based interface $N_{SMF}$, the AUSF module 104 has a service based interface $N_{AUSF}$, the NEF module 106 has a service based interface $N_{NEF}$, the NU module 107 has a service based interface $N_{NRF}$, the PCF module 108 has a service based interface $N_{PCF}$, the UDM module 109 has a service based interface $N_{UDM}$, and the AF module 110 has a service based interface $N_{AF}$.

It should be understood that, the service based interface of each network function module in this embodiment of this application may further have another name. This is not limited in this embodiment of this application.

In the service based architecture, the network function modules invoke network function services through the service based interfaces. Service based interfaces in an entire network support a same communication protocol. This means that a network function module having a service based interface can be accessed by any other network function module having a service based interface. That is, a network function service provided by a network function module having a service based interface can be invoked by any other network function module having a service based interface. In this way, there may be a problem of network function service abuse in the service based architecture, leading to relatively poor security performance.

For example, in a conventional network architecture, there is no communications interface between an AF and a UDM. That is, the AF cannot directly access the UDM. However, in the service based architecture, the AF has a capability of invoking a network function service in the UDM. Because the UDM stores sensitive information related to a user, the AF can randomly invoke the network function service in the UDM through the service based interface. This may cause leakage of user information.

A network function service invocation method provided in the embodiments of this application can improve security of invoking a network function service.

Figure 2:
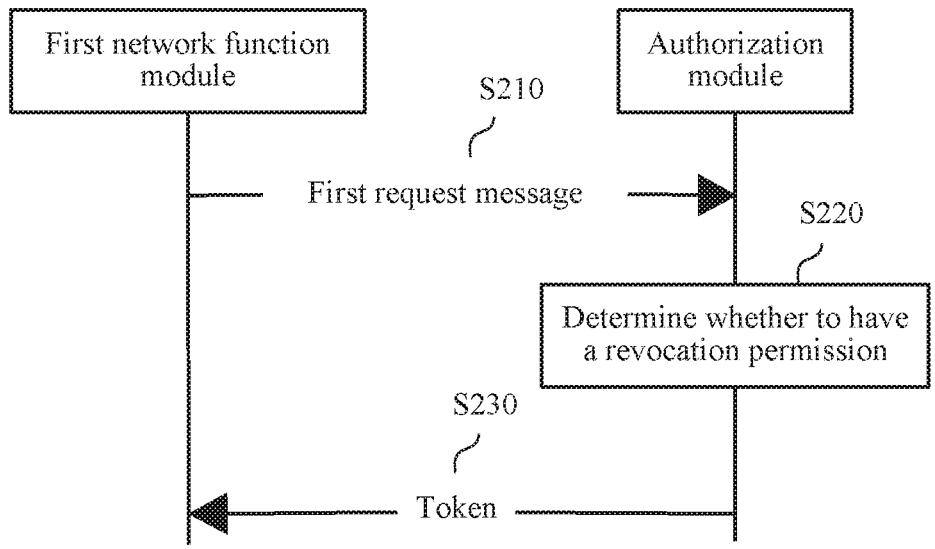
FIG. 2 is a schematic flowchart of a network function service invocation method according to an embodiment of this application.

FIG. 2 is a schematic flowchart of a network function service invocation method 200 according to an embodiment of this application. The method 200 may be applied to the network architecture shown in FIG. 1.

S210. A first network function module sends a first request message to an authorization module, where the first request message is used to request a permission to invoke a first network function service provided by a second network function module, the first request message carries first information, second information, and third information, the first information is used to indicate the first network function module, the second information is used to indicate the second network function module, and the third information is used to indicate the first network function service. Correspondingly, the authorization module receives the first request message sent by the first network function module.

It should be understood that, the first network function module can provide at least one network function service, the second network function module can provide at least one network function service, and the network function service provided by the first network function module is different from the network function service provided by the second network function module.

Optionally, for example, the authorization module may be the NRF module shown in FIG. 1, and the first network function module and the second network function module may be any two network function modules other than the NRF module, the RAN, and the UE shown in FIG. 1. For example, the first network function module may be the NEF module in FIG. 1, and the second network function module may be the AF module in FIG. 1. This is not limited in this embodiment of this application.

Optionally, the first information may include a type and/or an identifier of the first network function module, the second information may include a type and/or an identifier of the second network function module, and the third information may include an identifier of the first network function service. This is not limited in this embodiment of this application.

Optionally, a type of a network function module in this embodiment of this application may include an AMF, an SMF, an NRF, an NEF, an AF, or the like. This is not limited in this embodiment of this application.

Optionally, an identifier of the network function module in this embodiment of this application may include a name, an identification (ID), a serial number, a domain name, a network access identifier (NAI), a network protocol (e.g., Internet Protocol (IP)) address, or the like. This is not limited in this embodiment of this application.

Optionally, an identifier of a network function service in this embodiment of this application may include a name, an ID, a serial number, or the like of the network function service. This is not limited in this embodiment of this application.

S220. The authorization module determines, based on the first information, the second information, and the third information, whether the first network function module has the permission to invoke the first network function service.

In an optional embodiment, when the first information includes the type of the first network function module, the second information includes the type of the first network function module, and the third information includes the identifier of the first network function service, the authorization module may determine, based on the type of the first network function module, the type of the second network function module, the identifier of the first network function service, and pre-configured first authorization information, whether the first network function module has the permission to invoke the first network function service. The first authorization information is used to indicate at least one type of network function module that is allowed to invoke the first network function service.

Specifically, the authorization module may obtain the first authorization information based on the type of the second network function module and the identifier of the first network function service. When the at least one type indicated by the first authorization information includes the type of the first network function module, the authorization module determines that the first network function module has the permission to invoke the first network function service. Alternatively, when the at least one type indicated by the first authorization information does not include the type of the first network function module, the authorization module determines that the first network function module does not have the permission to invoke the first network function service.

Optionally, the first authorization information may include the at least one type of network function module that is allowed to invoke the first network function service.

In another optional embodiment, when the first information includes the identifier of the first network function module, and the second information includes the identifier of the second network function module and the identifier of the third network function module, the authorization module may determine, based on the identifier of the first network function module, the identifier of the second network function, the identifier of the first network function service, and pre-configured second authorization information, whether to grant the permission to invoke the first network function service. The second authorization information is used to indicate at least one network function module that is allowed to invoke the first network function service.

Specifically, the authorization module may obtain the second authorization information based on the identifier of the second network function module and the identifier of the first network function service. When the at least one network function module indicated by the second authorization information includes the first network function module, the authorization module determines that the first network function module has the permission to invoke the first network function service. Alternatively, when the at least one network function module indicated by the second authorization information does not include the first network function module, the authorization module determines that the first network function module does not have the permission to invoke the first network function service.

Optionally, the second authorization information may include an identifier of each of the at least one network function module that is allowed to invoke the first network function service.

In still another embodiment, when the first information includes the type of the first network function module and the identifier of the first network function module, the second network function module includes the type of the second network function module and the identifier of the second network function module, and the third information includes the identifier of the first network function service, the authorization module may determine, based on the type of the first network function module, the identifier of the first network function module, the type of the second network function module, the identifier of the second network function module, and pre-configured third authorization information, whether the first network function module has the permission to invoke the first network function service. The third authorization information is used to indicate at least one type of network function module that is allowed to invoke the first network function service and at least one network function module corresponding to each of the at least one type.

Specifically, the authorization module may obtain the third authorization information based on the type of the second network function module, the identifier of the second network function module, and the identifier of the first network function service. When the at least one type indicated by the third authorization information includes the type of the first network function module, and the at least one network function module includes the first network function module, the authorization module determining that the first network function module has the permission to invoke the first network function service. Alternatively, when the at least one type does not include the type of the first network function module, or when the at least one network function module indicated by the third authorization information does not include the first network function module, the authorization module determines that the first network function module does not have the permission to invoke the first network function service.

Optionally, the third authorization information may include the at least one type of network function module that is allowed to invoke the first network function service and an identifier of each of the at least one network function module corresponding to each type.

Optionally, the first request message may further carry at least one of an identifier of a network slice to which the first network function module belongs, an identifier of an operator providing a service for the first network function module, and a service request parameter of the first network function module. This is not limited in this embodiment of this application.

It should be understood that, the network slice may be understood as a logical network that can provide a particular network capability and network characteristic, and one network slice may include a plurality of network function modules.

Optionally, the identifier of the network slice in this embodiment of this application may be a name, a domain name, an ID, a serial number, and the like of the network slice, and the identifier of the operator may be a public land mobile network (PLMN) ID, a name, a serial number, and the like. This is not limited in this embodiment of this application.

Correspondingly, S220 may be determining, by the authorization module based on the first information, the second information, the third information, and at least one of the identifier of the network slice to which the first network function module belongs, the identifier of the operator providing the service for the first network function module, and the service request parameter of the first network function module, whether the first network function module has the permission to invoke the first network function service.

It should be understood that, the first network function module may have different permissions when invoking the first network function service to provide a service for different user equipments. Because the authorization module stores no authorization policy related to the user equipment, the network architecture provided in this embodiment of this application may further include a user data management module, and the authorization module may request, from the user data management module, an authorization policy of the first network function service corresponding to the user equipment.

Optionally, the user data management module may be the UDM shown in FIG. 1. This is not limited in this embodiment of this application.

Optionally, when the first network function service serves user equipment, before S220, the authorization module may send a second request message to the user data management module. The second request message is used to request an authorization policy of the first network function service corresponding to the user equipment, the second request message carries an identifier of the user equipment, and the authorization policy is used to indicate whether to grant, to the first network function module, the permission to invoke the first network function service corresponding to the user equipment. The authorization module receives the authorization policy sent by the user data management module based on the identifier of the user equipment.

Correspondingly, S220 may be determining, by the authorization module based on the first information, the second information, the third information, and the authorization policy, whether the first network function module has the permission to invoke the first network function service.

Optionally, the user data management module may preconfigure an authorization policy or an authorization rule of at least one network function service corresponding to each of at least one user equipment in a network. This is not limited in this embodiment of this application.

S230. The authorization module sends a token to the first network function module when determining that the first network function module has the permission to invoke the first network function service, where the token is used to indicate that the first network function module has the permission to invoke the first network function service of the second network function module. Correspondingly, the first network function module receives the token sent by the authorization module.

Optionally, before S230, the method further includes generating, by the authorization module, the token.

Optionally, before S230, the authorization module may perform identity authentication on the first network function module. S230 may be sending, by the authorization module, the token to the first network function module when determining that the identity authentication succeeds and that the first network function module has the permission to invoke the first network function service.

According to the network function service invocation method provided in this embodiment of this application, the authorization module sends the token to the first network function module when the identity authentication on the first network function module succeeds, thereby improving authorization security.

Optionally, the first network function module may further perform identity authentication on the authorization module, thereby further improving communication security.

Optionally, an identity authentication method in this embodiment of this application may include a symmetric key-based encryption algorithm or an asymmetric key-based encryption algorithm. This is not limited in this embodiment of this application.

FIG. 3 is a schematic diagram of a format of a token according to an embodiment of this application.

As shown in FIG. 3, the token may carry fourth information, fifth information, and sixth information, the fourth information is used to indicate that a network function module requesting to invoke a network function service is the first network function module, the fifth information is used to indicate that a network function module providing a network function service is the second network function module, the sixth information is used to indicate at least one network function service that the first network function module has a permission to invoke and that is provided by the second network function module, and the at least one network function service includes the first network function service.

Optionally, the fourth information may include a type and/or an identifier of the network function module requesting to invoke a network function service, the fifth information may include a type and/or an identifier of the network function module providing a network function service, and the sixth information may include an identifier of each of the at least one network function service. This is not limited in this embodiment of this application.

As shown in FIG. 3, the token may further carry an identifier of the token, a message verification code (a digital signature), and an algorithm for the message verification code (the digital signature).

For example, a calculation method of the message verification code may be MAC (info, K), where info includes information (except the message verification code and the digital signature) recorded in the token, K is a symmetric key shared by the authorization module and the first network function module, and MAC is a calculation function of the message verification code, for example, a keyed-hash message authentication code (HMAC) algorithm.

For another example, a calculation method of the digital signature may be E(PRAS, info), where info includes information (except the message verification code and the digital signature) recorded in the token, PRAS is a private key of the authorization module, and E is an asymmetric encryption algorithm, for example, an Rivest-Shamir-Adleman (RSA) algorithm.

As shown in FIG. 3, the token may further carry a validity period or at least one of an effective time and a failure time of the token. When the token carries the effective time or the failure time, the token may further carry validity duration.

For example, in this embodiment of this application, the effective time of the token is 12:38:21, Jan. 1, 2017 and may be expressed as 20170101123821, the failure time of the token is 14:40:51, Feb. 1, 2017 and may be expressed as 20170201144051, the validity period of the token is from the effective time to the failure time (to be specific, from 12:38:21, Jan. 1, 2017 to 14:40:51, Feb. 1, 2017) and may be expressed as 20170101123821-20170201144051, and the validity duration may be a time difference between the failure time and the effective time (to be specific, one month, two hours two minutes and thirty seconds) and may be expressed as 00000100020230.

As shown in FIG. 3, the token may further carry the identifier (for example, the PLMN ID) of the operator or an identifier of the authorization module issuing the token. This is not limited in this embodiment of this application.

Figure 4:
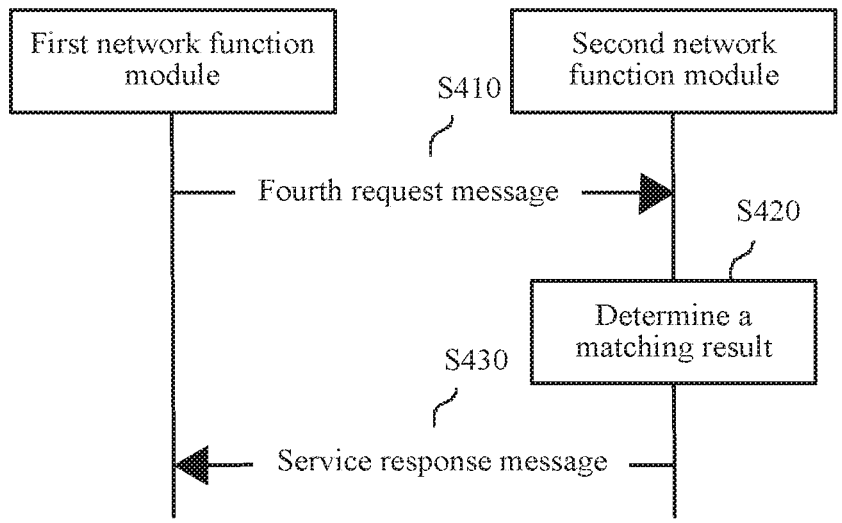
FIG. 4 is a schematic flowchart of another network function service invocation method according to an embodiment of this application.

FIG. 4 is a schematic flowchart of a network function service invocation method 400 according to an embodiment of this application. For example, the method 400 may be applied to the network architecture shown in FIG. 1.

S410. A first network function module sends a fourth request message to a second network function module, where the fourth request message is used to request to invoke a first network function service provided by the second network function module, the fourth request message carries first information, second information, third information, and a token, the first information is used to indicate the first network function module, the second information is used to indicate the second network function module, the third information is used to indicate the first network function service, the token carries fourth information, fifth information, and sixth information, the fourth information is used to indicate a network function module requesting to invoke a network function service, the fifth information is used to indicate a network function module providing a network function service, and the sixth information is used to indicate at least one network function service that the first network function module has a permission to invoke and that is provided by the second network function module. Correspondingly, the second network function module receives the fourth request message sent by the first network function module.

Optionally, the first information may include a type and/or an identifier of the first network function module, the second information may include a type and/or an identifier of the second network function module, and the third information may include an identifier of the first network function service. This is not limited in this embodiment of this application.

Optionally, the fourth information may include a type and/or an identifier of the network function module requesting to invoke a network function service, the fifth information may include a type and/or an identifier of the network function module providing a network function service, and the sixth information may include an identifier of each of the at least one network function service. This is not limited in this embodiment of this application.

Optionally, a type of a network function module in this embodiment of this application may include an AMF, an SMF, an NRF, an NEF, an AF, or the like. This is not limited in this embodiment of this application.

Optionally, an identifier of the network function module in this embodiment of this application may include a name, an ID, a serial number, a domain name, an NAI, an IP address, or the like. This is not limited in this embodiment of this application.

Optionally, an identifier of the network function service in this embodiment of this application may include a name, an ID, a serial number, or the like of the network function service. This is not limited in this embodiment of this application.

S420. The second network function module determines whether the network function module indicated by the fourth information is the same as the first network function module, whether the network function module indicated by the fifth information is the same as the second network function module, and whether the at least one network function service indicated by the sixth information includes the first network function service.

Specifically, the second network function module may match information in the fourth request message with information in the token, to be specific, match the first information in the fourth request message with the fourth information in the token, match the second information in the fourth request message with the fifth information in the token, and match the third information in the fourth request message with the sixth information in the token, to obtain a matching result.

S430. The second network function module sends a service response message of the first network function service to the first network function module when determining that the network function module indicated by the fourth information is the same as the first network function module, that the network function module indicated by the fifth information is the same as the second network function module, and that the at least one network function service indicated by the sixth information includes the first network function service.

Correspondingly, the second network function module rejects sending the service response message of the first network function service to the first network function module when determining that the network function module requesting authorization is different from the first network function module, that the network function module that is authorized is different from the second network function module, or that the at least one network function service that is authorized does not include the first network function service.

It should be understood that, the first network function module can provide at least one network function service, the second network function module can provide at least one network function service, and the network function service provided by the first network function module is different from the network function service provided by the second network function module.

Optionally, for example, the authorization module may be the NRF module shown in FIG. 1, and the first network function module and the second network function module may be any two network function modules other than the NRF module, the UE, and the RAN shown in FIG. 1. For example, the first network function module may be the NEF module in FIG. 1, and the second network function module may be the AF module in FIG. 1. This is not limited in this embodiment of this application.

Optionally, the first information may include a type and/or an identifier of the first network function module, the second information may include a type and/or an identifier of the second network function module, and the third information may include an identifier of the first network function service. This is not limited in this embodiment of this application.

It should be understood that, when the authorization module finds that a network function module is invaded or accessed without authorization, or when an operator needs to disable an access permission of the network function module due to adjustment of a network management policy, the authorization module can revoke a token issued for a network function service in the network function module. That is, the authorization module needs to confirm at least one token that has been revoked.

Optionally, the authorization module may indicate, to the second network function module, the at least one token that has been revoked, and the second network function module verifies validity of the token. Alternatively, the second network function module may send the token to the authorization module, request the authorization module to verify validity of the token, to obtain a verification result, and send the verification result to the second network function module. This is not limited in this embodiment of this application.

Optionally, the token may include an identifier of the token.

In an optional embodiment, before S430, the second network function module may send the third request message to the authorization module, where the third request message carries the token. The authorization module may verify validity of the token based on the identifier of the token and an identifier of at least one locally stored token that has been revoked, to obtain a first verification result, and send the first verification result to the second network function module. Correspondingly, the second network function module receives the first verification result sent by the authorization module based on the third request message, where the first verification result includes validity or invalidity. S430 may be sending, by the second network function module, the service response message of the first network function service to the first network function module when determining that the first verification result is validity, that the network function module requesting authorization is the same as the first network function module, that the network function module that is authorized is the same as the second network function module, and that the at least one network function service that is authorized includes the first network function service.

Correspondingly, the second network function module rejects sending the service response message of the first network function service to the first network function module when determining that the first verification result is invalidity, that the network function module requesting authorization is different from the first network function module, that the network function module that is authorized is different from the second network function module, or that the at least one network function service that is authorized does not include the first network function service.

Optionally, that the second network function module s the validity of the token based on the identifier of the token and the identifier of the locally stored at least one token that has been revoked, to obtain the first verification result may be determining, by the second network function module, whether the identifier of the at least one token includes the identifier of the token; and determining that the first verification result is invalidity when the identifier of the at least one token includes the identifier of the token; or determining that the first verification result is validity when the identifier of the at least one token does not include the identifier of the token.

Optionally, the authorization module may indicate the first verification result using at least one bit. This is not limited in this embodiment of this application.

For example, the authorization module may indicate the first verification result using one bit. The one bit being 1 indicates validity, and the one bit being 0 indicates invalidity.

In another optional embodiment, before S430, the second network function module may receive seventh information sent by the authorization module, where the seventh information includes an identifier of at least one token that has been revoked; and determine whether the identifier of the at least one token includes the identifier of the token. S430 may be sending, by the second network function module, the service response message of the first network function service to the first network function module when determining that the identifier of the at least one token does not include the identifier of the token, that the network function module requesting authorization is the same as the first network function module, that the network function module that is authorized is the same as the second network function module, and that the at least one network function service that is authorized includes the first network function service.

Correspondingly, the second network function module rejects sending the service response message of the first network function service to the first network function module when determining that the identifier of the at least one token includes the identifier of the token, that the network function module requesting authorization is different from the first network function module, that the network function module that is authorized is different from the second network function module, or that the at least one network function service that is authorized does not include the first network function service.

Optionally, the authorization module may periodically send the seventh information to the second network function module, or the authorization module may send the seventh information to the second network function module based on a request of the second network module. This is not limited in this embodiment of this application.

According to the network function service invocation method provided in this embodiment of this application, the authorization module or the second network function module determines, based on whether the identifier of the at least one token that has been revoked includes the identifier of the token used to invoke the first network function service, whether the token has been revoked. This can prevent an invalid token that has been revoked from being used to invoke a network function service, thereby improving security of invoking the network function service.

In addition, the authorization module indicates the at least one token that has been revoked to the second network function module, so that the second network function module can confirm the validity of the token, without a need to send the token to the authorization module for confirmation each time, thereby reducing signaling overheads.

Optionally, the token may further carry at least one of a message verification code and a digital signature.

In an optional embodiment, before S430, the second network function module may verify the message verification code and/or the digital signature, to obtain a second verification result, where the second verification result may indicate a success or a failure. S430 may be sending, by the second network function module, the service response message of the first network function service to the first network function module when determining that the second verification result indicates a success, that the network function module requesting authorization is the same as the first network function module, that the network function module that is authorized is the same as the second network function module, and that the at least one network function service that is authorized includes the first network function service.

Correspondingly, the second network function module rejects sending the service response message of the first network function service to the first network function module when determining that the second verification result indicates a failure, that the network function module requesting authorization is different from the first network function module, that the network function module that is authorized is different from the second network function module, or that the at least one network function service that is authorized does not include the first network function service.

Optionally, the second network function module may indicate the second verification result using at least one bit.

For example, the second network module may indicate the second verification result using one bit. The one bit being 1 indicates a success, and the one bit being 0 indicates a failure.

According to the network function service invocation method provided in this embodiment of this application, the second network function module verifies the message verification code or the digital signature, and provides the first network function service for the first network function module only after the verification succeeds, thereby improving security of invoking a network function service.

Optionally, the token further carries a validity period or at least one of an effective time and a failure time of the token. When the token carries the effective time or the failure time, the token may further carry validity duration.

It should be understood that, the validity period of the token may be represented by the effective time plus the failure time, or the effective time plus the validity duration.

In an optional embodiment, before S430, the second network function module may verify the validity period of the token based on the validity period or at least one of the effective time and the failure time of the token, to obtain a third verification result, where the third verification result may be validity or invalidity. S430 may be sending, by the second network function module, the service response message of the first network function service to the first network function module when determining that the third verification result is validity, that the network function module requesting authorization is the same as the first network function module, that the network function module that is authorized is the same as the second network function module, and that the at least one network function service that is authorized includes the first network function service.

In an optional embodiment, the authorization module may determine that the token is valid based on a case in which a current time is later than the effective time of the token and earlier than the failure time of the token.

In another optional embodiment, the authorization module may determine that the token is valid based on a case in which a current time is within the validity period of the token.

Correspondingly, the second network function module rejects sending the service response message of the first network function service to the first network function module when determining that the third verification result is invalidity, that the network function module requesting authorization is different from the first network function module, that the network function module that is authorized is different from the second network function module, or that the at least one network function service that is authorized does not include the first network function service.

According to the network function service invocation method provided in this embodiment of this application, the second network function module verifies, based on the validity period or at least one of the effective time and the failure time of the token that is in the token, whether the token is valid. This can prevent an expired invalid token from being used to invoke a network function service, thereby improving security of invoking the network function service.

Optionally, before S430, the second network function module may perform identity authentication on the first network function module. S430 may be sending, by the second network function module, the service response message of the first network function service to the first network function module when the identity authentication succeeds, the network function module requesting authorization is the same as the first network function module, the network function module that is authorized is the same as the second network function module, and the at least one network function service that is authorized includes the first network function service.

Correspondingly, the second network function module rejects sending the service response message of the first network function service to the first network function module when determining that the identity authentication fails, that the network function module requesting authorization is different from the first network function module, that the network function module that is authorized is different from the second network function module, or that the at least one network function service that is authorized does not include the first network function service.

According to the network function service invocation method provided in this embodiment of this application, the second network function module sends the service response message to the first network function module when the identity authentication on the first network function module succeeds, thereby improving security of invoking a network function service.

Optionally, the first network function module may further perform identity authentication on the second network function module, thereby further improving communication security.

Optionally, an identity authentication method in this embodiment of this application may include a symmetric key-based encryption algorithm or an asymmetric key-based encryption algorithm. This is not limited in this embodiment of this application.

It should be understood that, the second network function module may determine, in one or more of the foregoing manners, whether to send the service response message to the first network function module. This is not limited in this embodiment of this application.

It should be understood that, the token in this embodiment of this application may be repeatedly used within the validity period, without a need to obtain the token each time when a network function service is requested, thereby reducing signaling overheads. A start time of the validity period may be the effective time of the token, and an end time of the validity period may be the failure time of the token. This is not limited in this embodiment of this application.

It should further be understood that, the token in this embodiment of this application carries the sixth information, where the sixth information is used to indicate the at least one network function service that is authorized. When the first network function module requests any one of the at least one network function service, there is no need to request the token from the authorization module again, thereby further reducing signaling overheads.

For example, when the at least one network function service indicated by the sixth information includes a second network function service provided by the second network function module, the first network function module may further use the token to invoke the second network function service.

For another example, within the validity period, the first network function module may use the token for a plurality of times to invoke the at least one network function service that is authorized.

Figure 5:
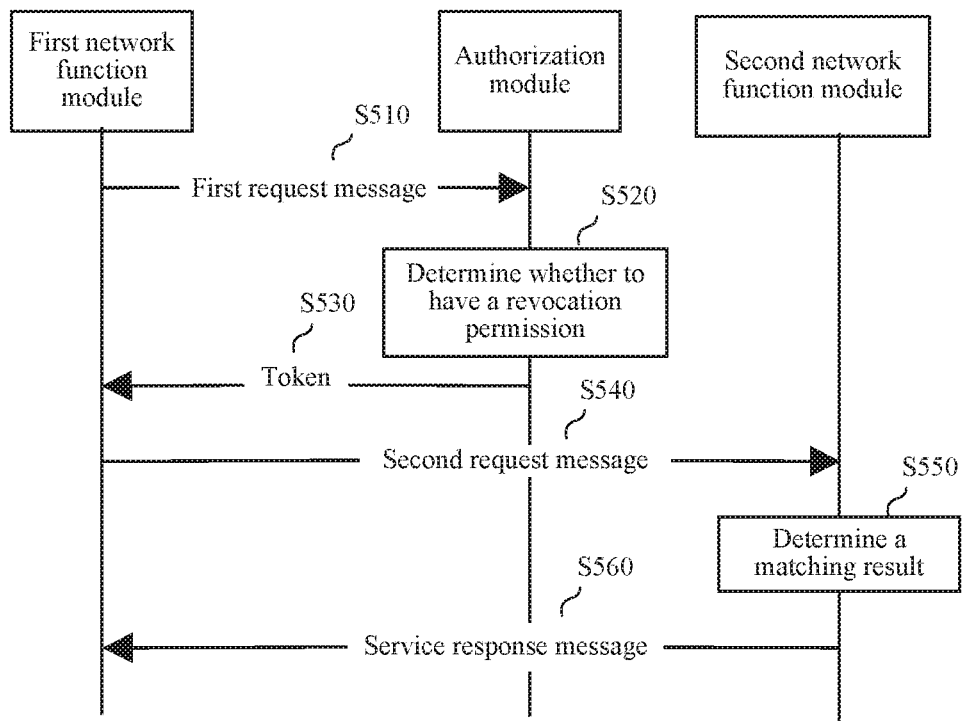
FIG. 5 is a schematic flowchart of still another network function service invocation method according to an embodiment of this application.

FIG. 5 is a schematic flowchart of a network function service invocation method 500 according to an embodiment of this application. For example, the method 500 may be applied to the network architecture shown in FIG. 1.

S510. The first network function module sends a first request message to the authorization module, where the first request message is used to request a permission to invoke a first network function service provided by a second network function module, the first request message carries first information, second information, and third information, the first information is used to indicate the first network function module, the second information is used to indicate the second network function module, and the third information is used to indicate the first network function service. Correspondingly, the authorization module receives the first request message sent by the first network function module.

Optionally, for example, the first network function module may be the AMF module shown in FIG. 1, the second network function module may be the AUSF module shown in FIG. 1, and the authorization module may be the NRF module shown in FIG. 1. This is not limited in this embodiment of this application.

For example, the AMF module may send the first request message to the NRF module, where the first request message is used to request a user authentication (NAUSF_UE Authentication) service provided by the AUSF module, and the first request message carries an ID of the AMF module, an ID of the AUSF module, and an ID of the UE authentication service.

S520. The authorization module determines, based on the first information, the second information, and the third information, whether the first network function module has the permission to invoke the first network function service.

For example, the NRF module may determine, based on the ID of the AMF module, the ID of the AUSF module, and the ID of the UE authentication service, whether the AMF has a permission to invoke the UE authentication service.

Optionally, it is assumed that the ID of the AMF module is amf0.5gc.mnc000.mcc460.3gppnetwork.org, the ID of the second network function module is ausf1.5gc.mnc000.mcc460.3gppnetwork.org, and the ID of the UE authentication service is NAUDF_UE Authentication. The authorization information may be, for example, an authorization table of the UE authentication service.

Figures 6, 7:
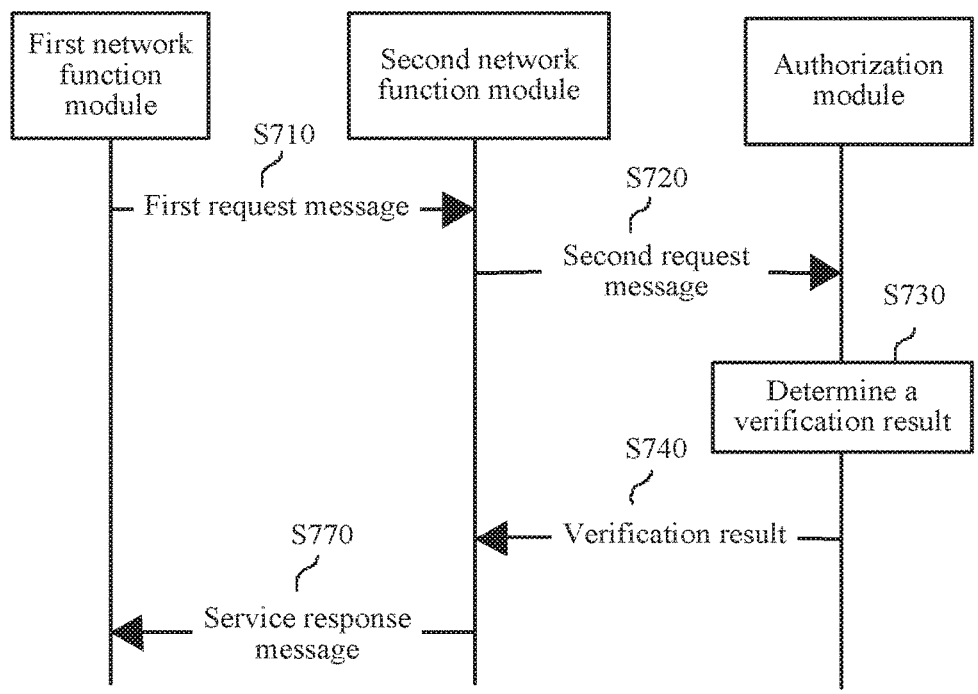
FIG. 6 is a schematic diagram of a format of an authorization table according to an embodiment of this application.
FIG. 7 is a schematic flowchart of still another network function service invocation method according to an embodiment of this application.

Specifically, the NRF module may obtain an authorization table shown in FIG. 6 from a plurality of locally stored authorization tables based on the ID of the AUSF module and the ID of the UE authentication service. The NRF module may determine, based on a case in which an identifier of at least one network function module in the authorization table includes the identifier of the AMF module, that the AMF module has the permission to invoke the UE authentication service.

It should be understood that, the authorization table shown in FIG. 6 is only an optional representation of the authorization information, and the authorization information may alternatively be a mapping table, a mapping diagram, or the like that can represent a form of the authorization information. This is not limited in this embodiment of this application.

S530. The authorization module sends a token to the first network function module when determining that the first network function module has the permission to invoke the first network function service, where the token carries fourth information, fifth information, and sixth information, the fourth information is used to indicate that a network function module requesting to invoke a network function service is the first network function module, the fifth information is used to indicate that a network function module providing a network function service is the second network function module, the sixth information is used to indicate at least one network function service that the first network function module has a permission to invoke and that is provided by the second network function module, and the at least one network function service includes the first network function service. Correspondingly, the first network function module receives the token sent by the authorization module.

S540. The first network function module sends a second request message to the second network function module, where the second request message is used to request to invoke the first network function service, and the second request message carries the first information, the second information, the third information, and the token. Correspondingly, the second network function module receives the second request message sent by the first network function module.

For example, the AMF module may send the second request message to the AUSF module, where the second request message is used to request the UE authentication service, and the second request message carries the ID of the AMF module, the ID of the AUSF module, the ID of the UE authentication service, and the token shown in FIG. 3.

S550. The second network function module determines whether the network function module indicated by the fourth information is the same as the first network function module, whether the network function module indicated by the fifth information is the same as the second network function module, and whether the at least one network function service indicated by the sixth information includes the first network function service.

Specifically, the second network function module may match information in the second request message with information in the token, to obtain a matching result.

S560. The second network function module sends a service response message of the first network function service to the first network function module when determining that the network function module indicated by the fourth information is the same as the first network function module, that the network function module indicated by the fifth information is the same as the second network function module, and that the at least one network function service indicated by the sixth information includes the first network function service. Correspondingly, the first network function module receives the service response message sent by the second network function module.

For example, as shown in FIG. 3, the AUSF module sends a service response message of the UE authentication service to the first network function module based on a case in which an identifier of the network function module requesting to invoke a network function service is the same as the ID of the AMF module, an identifier of the network function module providing a network function service is the same as the ID of the AUSF module, and a network function service list includes the ID of the UE authentication service.

Optionally, the service response message of the UE authentication service may include information related to a UE authentication service request, or an Acknowledgement (ACK) fed back after the UE authentication service is executed. This is not limited in this embodiment of this application.

FIG. 7 shows a network function service invocation method according to an embodiment of this application. For example, the method may be applied to the network architecture shown in FIG. 1.

S710. A first network function module sends a first request message to a second network function module, where the first request message is used to request to invoke a first network function service provided by the second network function module, the first request message carries first information, second information, and third information, the first information is used to indicate the first network function module, the second information is used to indicate the second network function module, and the third information is used to indicate the first network function service. Correspondingly, the second network function module receives the first request message sent by the first network function module.

Optionally, for example, the first network function module may be the AMF module shown in FIG. 1, the second network function module may be the AUSF module shown in FIG. 1, and an authorization module may be the NRF module shown in FIG. 1. This is not limited in this embodiment of this application.

For example, the AMF module may send the first request message to the AUSF module, where the first request message is used to request a user authentication (NAUSF_UE Authentication) service provided by the AUSF module, and the first request message carries an ID of the AMF module, an ID of the AUSF module, and an ID of the UE authentication service.

S720. The second network function module sends a second request message to the authorization module based on the first information, the second information, and the third information, where the second request message is used to request to verify a permission of the first network function module to invoke the first network function service, and the second request message carries the first information, the second information, and the third information. Correspondingly, the authorization module receives the second request message sent by the second network function module.

For example, the AUSF module may send the second request message to the NRF module based on the first request message, where the second request message is used to request to verify a permission of the AMF module to invoke the UE authentication service, and the second request message carries the ID of the AMF module, the ID of the AUSF module, and the ID of the UE authentication service.

S730. The authorization module verifies, based on the first information, the second information, and the third information, whether the first network function module has the permission to invoke the first network function service, to obtain a verification result, where the verification result includes that the first network function module has the permission to invoke the first network function service or that the first network function module does not have the permission to invoke the first network function service.

Optionally, the authorization module may indicate the verification result using at least one bit. This is not limited in this embodiment of this application.

In an optional embodiment, the authorization module may indicate the verification result using one bit. For example, the bit being 1 indicates that the first network function module has the permission to invoke the first network function service, and the bit being 0 indicates that the first network function module does not have the permission to invoke the first network function service.

For example, the NRF module may obtain an authorization table shown in FIG. 6 from a plurality of locally stored authorization tables based on the ID of the AUSF module and the ID of the UE authentication service. The NRF module may determine, based on a case in which an identifier of at least one network function module in the authorization table includes the identifier of the AMF module, that the AMF module has the permission to invoke the UE authentication service.

S740. The authorization module sends the verification result to the second network function module. Correspondingly, the second network function module receives the verification result sent by the authorization module.

For example, the NRF module sends the verification result to the AUSF module, where the verification result is used to indicate that the AMF module has the permission to invoke the UE authentication service.

S750. When the verification result is that the first network function module has the permission to invoke the first network function service, the second network function module sends a service response message of the first network function service to the first network function module. Correspondingly, the first network function module receives the service response message sent by the second network function module.

For example, the AUSF module sends a service response message of the UE authentication service to the AMF module based on a case in which the verification result indicates that the AMF module has the permission to invoke the UE authentication service.

The foregoing describes the network function service invocation method provided in the embodiments of this application in detail with reference to FIG. 1 to FIG. 7. The following describes a network function service invocation apparatus provided in the embodiments of this application with reference to FIG. 8 to FIG. 14.

Figure 8:
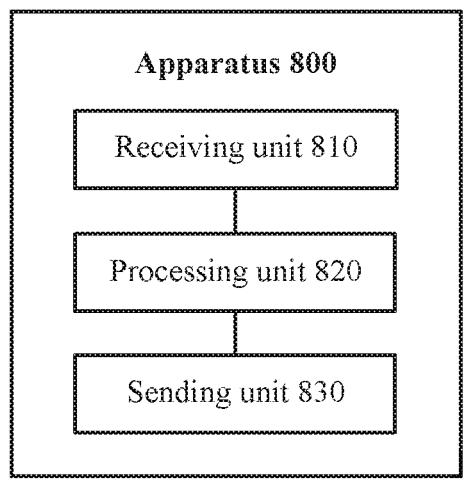
FIG. 8 is a schematic block diagram of a network function service invocation apparatus according to an embodiment of this application.

FIG. 8 shows a network function service invocation apparatus 800 according to an embodiment of this application. The apparatus 800 includes a receiving unit 810 configured to receive a first request message sent by a first network function module, where the first request message is used to request a permission to invoke a first network function service provided by a second network function module, the first request message carries first information, second information, and third information, the first information is used to indicate the first network function module, the second information is used to indicate the second network function module, and the third information is used to indicate the first network function service; a processing unit 820 configured to determine, based on the first information, the second information, and the third information that are received by the receiving unit 810, whether the first network function module has the permission to invoke the first network function service; and a sending unit 830 configured to send a token to the first network function module when the processing unit 820 determines that the first network function module has the permission to invoke the first network function service, where the token is used to indicate that the first network function module has the permission to invoke the first network function service of the second network function module.

Optionally, the token carries fourth information, fifth information, and sixth information, the fourth information is used to indicate that a network function module requesting to invoke a network function service is the first network function module, the fifth information is used to indicate that a network function module providing a network function service is the second network function module, the sixth information is used to indicate at least one network function service that the first network function module has a permission to invoke and that is provided by the second network function module, and the at least one network function service includes the first network function service.

Optionally, the first network function service serves user equipment. The sending module is further configured to send a second request message to a user data management module, where the second request message is used to request an authorization policy of the first network function service corresponding to the user equipment, the second request message carries an identifier of the user equipment, and the authorization policy is used to indicate whether to grant, to the first network function module, the permission to invoke the first network function service corresponding to the user equipment. The receiving unit is further configured to receive the authorization policy sent by the user data management module based on the identifier of the user equipment. The processing unit is specifically configured to determine, based on the first information, the second information, the third information, and the authorization policy, whether the first network function module has the permission to invoke the first network function service.

Optionally, the sending unit is further configured to send seventh information to the second network function module, where the seventh information includes an identifier of at least one token that has been revoked.

Optionally, the token further carries an identifier of the token. The receiving unit is further configured to receive a third request message sent by the second network function module, where the third request message carries the token. The processing unit is further configured to verify validity of the token based on the identifier of the token, to obtain a verification result. The sending unit is further configured to send the verification result to the second network function module.

It should be understood that, the apparatus 800 herein is represented in a form of a functional unit. The term "unit" herein may be an application-specific integrated circuit (ASIC), an electronic circuit, a processor for performing one or more software or firmware programs (for example, a shared processor, a dedicated processor, or a packet processor) and a memory, a combined logic circuit, and/or another proper component that supports the described functions. In an optional example, a person skilled in the art may understand that, the apparatus 800 may be specifically the authorization module in the embodiments of the method 200 to the method 700. The apparatus 800 may be configured to perform various procedures and/or steps corresponding to the authorization module in the embodiments of the method 200 to the method 600. To avoid repetition, details are not described herein again.

Figure 9:
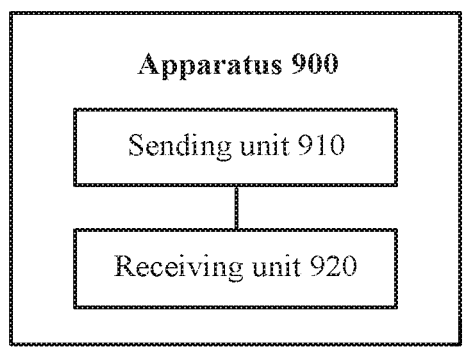
FIG. 9 is a schematic block diagram of another network function service invocation apparatus according to an embodiment of this application.

FIG. 9 shows a network function service invocation apparatus 900 according to an embodiment of this application. The apparatus 900 includes a sending unit 910 configured to send a fourth request message to a second network function module, where the fourth request message is used to request to invoke a first network function service provided by the second network function module, the fourth request message carries first information, second information, third information, and a token, the first information is used to indicate the first network function module, the second information is used to indicate the second network function module, the third information is used to indicate the first network function service, and the token is used to indicate that the first network function module has a permission to invoke the first network function service of the second network function module; and a receiving unit 920 configured to receive a service response message that is of the first network function service and that is sent by the second network function module, where the service response message is sent based on the first information, the second information, the third information, and the token that are sent by the sending unit 910.

Optionally, the token carries fourth information, fifth information, and sixth information, where the fourth information is used to indicate a network function module requesting to invoke a network function service, the fifth information is used to indicate a network function module providing a network function service, and the sixth information is used to indicate at least one network function service that the first network function module has a permission to invoke and that is provided by the second network function module.

Optionally, before sending the fourth request message to the second network function module, the sending unit is further configured to send a first request message to an authorization module, where the first request message is used to request the permission to invoke the first network function service, and the first request message carries the first information, the second information, and the third information. The receiving unit is further configured to receive the token sent by the authorization module, where the token is sent based on the first information, the second information, and the third information.

It should be understood that, the apparatus 900 herein is represented in a form of a functional unit. The term "unit" herein may be an ASIC, an electronic circuit, a processor for performing one or more software or firmware programs (for example, a shared processor, a dedicated processor, or a packet processor) and a memory, a combined logic circuit, and/or another proper component that supports the described functions. In an optional example, a person skilled in the art may understand that, the apparatus 900 may be specifically the second network node in the embodiments of the method 200 to the method 600. The apparatus 900 may be configured to perform various procedures and/or steps corresponding to the first network function module in the embodiments of the method 200 to the method 600. To avoid repetition, details are not described herein again.

Figure 10:
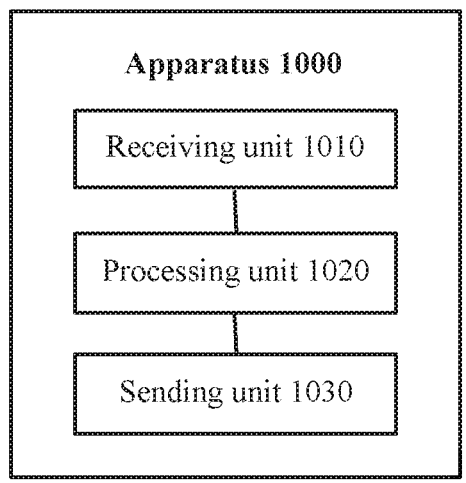
FIG. 10 is a schematic block diagram of still another network function service invocation apparatus according to an embodiment of this application.

FIG. 10 shows a network function service invocation apparatus 1000 according to an embodiment of this application. The apparatus 1000 includes a receiving unit 1010 configured to receive a fourth request message sent by a first network function module, where the fourth request message is used to request to invoke a first network function service provided by the second network function module, the fourth request message carries first information, second information, third information, and a token, the first information is used to indicate the first network function module, the second information is used to indicate the second network function module, the third information is used to indicate the first network function service, the token carries fourth information, fifth information, and sixth information, the fourth information is used to indicate a network function module requesting to invoke a network function service, the fifth information is used to indicate a network function module providing a network function service, and the sixth information is used to indicate at least one network function service that the first network function module has a permission to invoke and that is provided by the second network function module; a processing unit 1020 configured to determine whether the network function module indicated by the fourth information received by the receiving unit 1010 is the same as the first network function module, whether the network function module indicated by the fifth information is the same as the second network function module, and whether the at least one network function service indicated by the sixth information includes the first network function service; and a sending unit 1030 configured to send a service response message of the first network function service to the first network function module when the processing unit 1020 determines that the network function module indicated by the fourth information is the same as the first network function module, that the network function module indicated by the fifth information is the same as the second network function module, and that the at least one network function service indicated by the sixth information includes the first network function service.

Optionally, the token further carries an identifier of the token. The receiving unit is further configured to receive seventh information sent by the authorization module, where the seventh information includes an identifier of at least one token that has been revoked. The processing unit is further configured to determine whether the identifier of the at least one token includes the identifier of the token. The sending unit is specifically configured to send the service response message of the first network function service to the first network function module when it is determined that the identifier of the at least one token does not include the identifier of the token, that the network function module indicated by the fourth information is the same as the first network function module, that the network function module indicated by the fifth information is the same as the second network function module, and that the at least one network function service indicated by the sixth information includes the first network function service.

Optionally, the token further carries an identifier of the token. The sending unit is further configured to send a third request message to the authorization module, where the third request message is used to request to verify validity of the token, and the third request message carries the token. The receiving unit is further configured to receive a verification result sent by the authorization module based on the identifier of the token, where the verification result is validity or invalidity. The sending unit is specifically configured to send the service response message of the first network function service to the first network function module when it is determined that the verification result is validity, that the network function module indicated by the fourth information is the same as the first network function module, that the network function module indicated by the fifth information is the same as the second network function module, and that the at least one network function service indicated by the sixth information includes the first network function service.

It should be understood that, the apparatus 1000 herein is represented in a form of a functional unit. The term "unit" herein may be an application specific integrated circuit (ASIC), an electronic circuit, a processor for performing one or more software or firmware programs (for example, a shared processor, a dedicated processor, or a packet processor) and a memory, a combined logic circuit, and/or another proper component that supports the described functions. In an optional example, a person skilled in the art may understand that, the apparatus 1000 may be specifically the second network function module in the embodiments of the method 200 to the method 600. The apparatus 1000 may be configured to perform various procedures and/or steps corresponding to the second network function module in the embodiments of the method 200 to the method 600. To avoid repetition, details are not described herein again.

Figure 11:
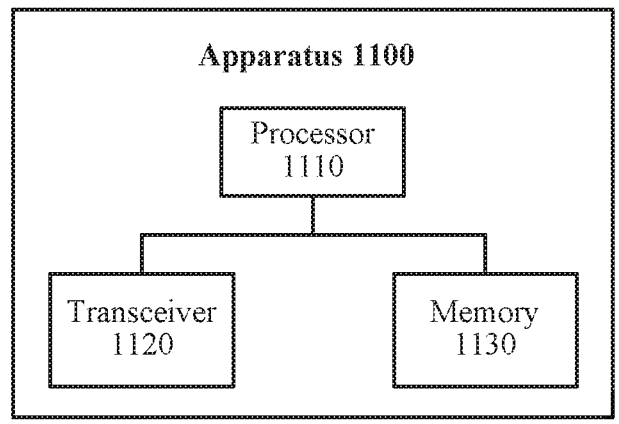
FIG. 11 is a schematic block diagram of still another network function service invocation apparatus according to an embodiment of this application.

FIG. 11 shows a network function service invocation apparatus 1100 according to an embodiment of this application. The apparatus 1100 may be the authorization module in FIG. 2 to FIG. 7. The authorization module may use a hardware architecture shown in FIG. 11. The authorization module may include a processor 1110, a transceiver 1120, and a memory 1130. The processor 1110, the transceiver 1120, and the memory 1130 communicate with each other through an internal connection path. A related function implemented by the processing unit 820 in FIG. 8 may be implemented by the processor 1110, and related functions implemented by the receiving unit 810 and the sending unit 830 may be implemented by the processor 1110 controlling the transceiver 1120.

The processor 1110 may include one or more central processing units (CPU). When the processor is one CPU, the CPU may be a single-core CPU or a multi-core CPU.

The transceiver 1120 is configured to send and receive data and/or a signal. The transceiver may include a transmitter and a receiver, where the transmitter is configured to send data and/or a signal, and the receiver is configured to receive data and/or a signal.

The memory 1130 includes but is not limited to a random access memory (RAM), a read-only memory (ROM), an erasable programmable memory (EPROM), and a compact disc read-only memory (CD-ROM). The memory 1130 is configured to store related instructions and data.

The memory 1130 is configured to store program code and data of the authorization module, and may be an independent component or be integrated into the processor 1110.

Specifically, the processor 1110 is configured to control the transceiver to communicate with a first network function module and/or a second network function module. For details, refer to the descriptions in the method embodiments. Details are not described herein again.

It may be understood that FIG. 11 shows merely a simplified design of the authorization module. In an actual application, the authorization module may further include other necessary components, including but not limited to any quantity of transceivers, processors, controllers, memories, and the like. All authorization modules that can implement this application fall within the protection scope of this application.

In a possible design, the apparatus 1100 may be a chip, for example, may be a communications chip that can be used in the authorization module configured to implement a related function of the processor 1110 of the authorization module. The chip may be a field programmable gate array, a dedicated integrated chip, a system chip, a central processing unit, a network processor, a digital signal processing circuit, or a microcontroller that implements the related function, or may use a programmable controller or another integrated chip. Optionally, the chip may include one or more memories configured to store program code. When the code is executed, the processor implements a corresponding function.

Figure 12:
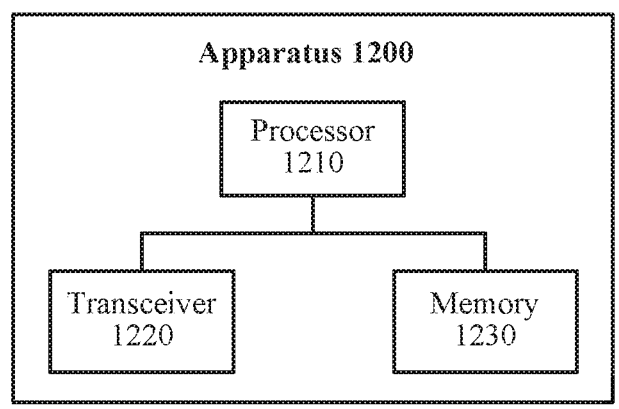
FIG. 12 is a schematic block diagram of still another network function service invocation apparatus according to an embodiment of this application.

FIG. 12 shows a network function service invocation apparatus 1200 according to an embodiment of this application. The apparatus 1200 may be the first network function module in FIG. 2 to FIG. 6. The first network function module may use a hardware architecture shown in FIG. 12. The first network function module may include a processor 1210, a transceiver 1220, and a memory 1230. The processor 1210, the transceiver 1220, and the memory 1230 communicate with each other through an internal connection path. Related functions implemented by the sending unit 910 and the receiving unit 920 in FIG. 9 may be implemented by the processor 1210 controlling the transceiver 1220.

The processor 1210 may include one or more processors, for example, may include one or more CPUs. When the processor is one CPU, the CPU may be a single-core CPU or a multi-core CPU.

The transceiver 1220 is configured to send and receive data and/or a signal, and receive data and/or a signal. The transceiver may include a transmitter and a receiver, where the transmitter is configured to send data and/or a signal, and the receiver is configured to receive data and/or a signal.

The memory 1230 includes but is not limited to a RAM, a ROM, an EPROM, and a CD-ROM. The memory 1230 is configured to store related instructions and data.

The memory 1230 is configured to store program code and data of the first network function module, and may be an independent component or be integrated into the processor 1210.

Specifically, the processor 1210 is configured to control the transceiver to communicate with an authorization module and/or a second network function module. For details, refer to the descriptions in the method embodiments. Details are not described herein again.

It may be understood that FIG. 12 shows merely a simplified design of the first network function module. In an actual application, the first network function module may further include other necessary components, including but not limited to any quantity of transceivers, processors, controllers, memories, and the like. All first network function modules that can implement this application fall within the protection scope of this application.

In a possible design, the apparatus 1200 may be a chip, for example, may be a communications chip that can be used in the first network function module configured to implement a related function of the processor 1210 of the first network function module. The chip may be a field programmable gate array, a dedicated integrated chip, a system chip, a central processing unit, a network processor, a digital signal processing circuit, or a microcontroller that implements the related function, or may use a programmable controller or another integrated chip. Optionally, the chip may include one or more memories configured to store program code. When the code is executed, the processor implements a corresponding function.

Figure 13:
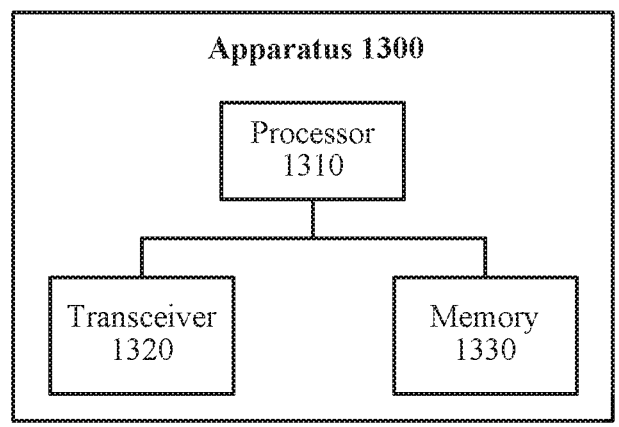
FIG. 13 is a schematic block diagram of still another network function service invocation apparatus according to an embodiment of this application.

FIG. 13 shows a network function service invocation apparatus 1300 according to an embodiment of this application. The apparatus 1300 may be the second network function module in FIG. 2 to FIG. 6. The second network function module may use a hardware architecture shown in FIG. 13. The second network function module may include a processor 1310, a transceiver 1320, and a memory 1330. The processor 1310, the transceiver 1320, and the memory 1330 communicate with each other through an internal connection path. A related function implemented by the processing unit 1020 in FIG. 10 may be implemented by the processor 1310, and related functions implemented by the receiving unit 1010 and the sending unit 1030 may be implemented by the processor 1310 controlling the transceiver 1320.

The processor 1310 may include one or more processors, for example, may include one or more CPUs. When the processor is one CPU, the CPU may be a single-core CPU or a multi-core CPU.

The transceiver 1320 is configured to send and receive data and/or a signal, and receive data and/or a signal. The transceiver may include a transmitter and a receiver, where the transmitter is configured to send data and/or a signal, and the receiver is configured to receive data and/or a signal.

The memory 1330 includes but is not limited to a RAM, a ROM, an EPROM, and a CD-ROM. The memory 1330 is configured to store related instructions and data.

The memory 1330 is configured to store program code and data of the second network function module, and may be an independent component or be integrated into the processor 1310.

Specifically, the processor 1310 is configured to control the transceiver to communicate with an authorization module and/or a first network function module. For details, refer to the descriptions in the method embodiments. Details are not described herein again.

It may be understood that FIG. 13 shows merely a simplified design of the second network function module. In an actual application, the second network function module may further include other necessary components, including but not limited to any quantity of transceivers, processors, controllers, memories, and the like. All second network function modules that can implement this application fall within the protection scope of this application.

In a possible design, the apparatus 1300 may be a chip, for example, may be a communications chip that can be used in the second network function module configured to implement a related function of the processor 1310 of the second network function module. The chip may be a field programmable gate array, a dedicated integrated chip, a system chip, a central processing unit, a network processor, a digital signal processing circuit, or a microcontroller that implements the related function, or may use a programmable controller or another integrated chip. Optionally, the chip may include one or more memories configured to store program code. When the code is executed, the processor implements a corresponding function.

Figure 14:
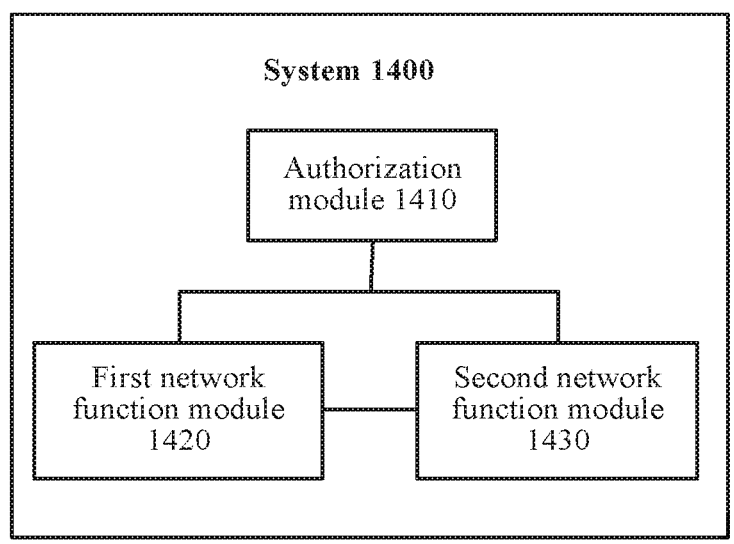
FIG. 14 is a schematic block diagram of a network function service invocation system according to an embodiment of this application.

FIG. 14 is a schematic block diagram of a network function service invocation system 1400 according to an embodiment of this application. The system 1400 includes a first network function module 1420, an authorization module 1410, and a second network function module 1430.

Optionally, the first network function module 1420 can implement, for example, a function implemented by the first network function module in the embodiments of the method 200 to the method 600, the authorization module 1410 can implement, for example, a function implemented by the authorization module in the embodiments of the method 200 to the method 600, and the second network function module 1430 can implement, for example, a function implemented by the second network function module in the embodiments of the method 200 to the method 600. To avoid repetition, details are not described herein again.

Optionally, the first network function module 1420 can implement, for example, a function implemented by the first network function module in the embodiment of the method 700, the authorization module 1120 can implement, for example, a function implemented by the authorization module in the embodiment of the method 700, and the second network function module 1430 can implement, for example, a function implemented by the second network function module in the embodiment of the method 700. To avoid repetition, details are not described herein again.

It should be understood that, the first network function module, the second network function module, and the authorization module in this embodiment of this application each have a particular function and a network interface, and may be different network elements on same dedicated hardware, different software instances that run on same dedicated hardware, or different virtual function instances on a same related platform (for example, a cloud infrastructure). This is not limited in this embodiment of this application.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instruction may be stored in a computer readable storage medium, or may be transmitted using the computer readable storage medium. The computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, an SSD), or the like.

A person of ordinary skill in the art may understand that all or some of the processes of the methods in the embodiments may be implemented by a computer program instructing related hardware. The program may be stored in a computer readable storage medium. When the program is executed, the processes of the methods in the embodiments are performed. The foregoing storage medium includes various media that can store program code, such as a ROM, a RAM, a magnetic disk, or an optical disc.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network function service invocation method, comprising:
    sending, by a first network function network element, a first request message to an authorization network element, wherein the first request message requests permission to invoke a first network function service provided by a second network function network element, wherein the first request message carries a type of the first network function network element, an identifier of the first network function network element, a type of the second network function network element, an identifier of the first network function service, and an identifier of a network slice to which the first network function network element belongs;
    perforating, by the authorization network element, identity authentication on the first network function network element;
    generating, by the authorization network element, a token when determining that the identity authentication succeeds, wherein the token indicates that the first network function network element has the permission to invoke the first network function service of the second network function network element, wherein the token comprises the identifier of the first network function network element, the type of the second network function network element, the identifier of the first network function service, and the identifier of the network slice to which the first network function network element belongs; and
    sending, by the authorization network element, the token to the first network function network element.

2. The network function service invocation method of claim 1, further comprising:
    sending, by the first network function network element, a second request message to the second network function network element, wherein the second request message requests to invoke the first network function service provided by the second network function network element, wherein the second request message carries the token, and wherein the token comprises a digital signature;

verifying, by the second network function network element, the digital signature; and sending, by the second network function network element, a service response message to the first network function network element when the digital signature is verified successfully.

3. The network function service invocation method of claim 1, further comprising:

sending, by the first network function network element, a second request message to the second network function network element, wherein the second request message requests to invoke the first network function service provided by the second network function network element, wherein the second request message carries the token, and wherein the token comprises a message verification code (MAC);

checking, by the second network function network element, the MAC value; and sending, by the second network function network element, a service response message to the first network function network element when the MAC value is checked successfully.

4. The network function service invocation method of claim 1, further comprising:

sending, by the first network function network element, a second request message to the second network function network element, wherein the second request message requests to invoke the first network function service provided by the second network function network element, wherein the second request message carries the token, and wherein the token comprises a validity period;

verifying, by the second network function network element, the validity period; and sending, by the second network function network element, a service response message to the first network function network element when the validity period is verified successfully.

5. The network function service invocation method of claim 1, further comprising:

sending, by the first network function network element, a second request message to the second network function network element, wherein the second request message requests to invoke the first network function service provided by the second network function network element, and wherein the second request message carries the token;

verifying, by the second network function network element, the type of the second network function network element and the identifier of the network slice included in the token; and sending, by the second network function network element, a service response message to the first network function network element when the type of the second network function network element and the identifier of the network slice are verified successfully.

6. The network function service invocation method of claim 1, further comprising:

sending, by the first network function network element, a second request message to the second network function network element, wherein the second request message requests to invoke the first network function service provided by the second network function network element, wherein the second request message carries the token, and wherein the token further comprises a digital signature and a validity period;

verifying, by the second network function network element, the digital signature;

verifying, by the second network function network element, the type of the second network function network element included in the token, the identifier of the network slice included in the token, and the validity period when the digital signature is verified successfully; and sending, by the second network function network element, a service response message to the first network function network element when the type of the second network function network element included in the token, the identifier of the network slice included in the token, and the validity period are verified successfully.

7. The network function service invocation method of claim 1, further comprising:

sending, by the first network function network element, a second request message to the second network function network element, wherein the second request message requests to invoke the first network function service provided by the second network function network element, and wherein the second request message carries the token;

sending, by the second network function network element, a third request message to the authorization network element in response to receiving the second request message, wherein the third request message comprises the token;

verifying, by the authorization network element, validity of the token to obtain a verification result;

sending, by the authorization network element, the verification result to the second network function network element; and sending, by the second network function network element, a service response message to the first network function network element when the verification result is verified successfully.

8. The network function service invocation method of claim 1, wherein the token further comprises an identifier of an operator providing a service for the first network function network element.

9. The network function service invocation method of claim 8, wherein the identifier of the operator is an identifier of a public land mobile network (PLMN).

10. The network function service invocation method of claim 1, wherein the token comprises an identifier of the authorization network element.

11. A system for invocating network function service, comprising:

a first network function network element comprising:

at least one processor; and a memory coupled to the at least one processor and having program instructions stored thereon which, when executed by the at least one processor, cause the first network function network element to:

send a first request message to an authorization network element, wherein the first request message requests permission to invoke a first network function service provided by a second network function network element, wherein the first request message carries a type of the first network function network element, an identifier of the first network function network element, a type of the second network function network element, an identifier of the first network function service, and an identifier of a network slice to which the first network function network element belongs;
the authorization network element comprising:
at least one processor; and
a memory coupled to the at least one processor and having program instructions stored thereon which, when executed by the at least one processor, cause the authorization network element to:
perform identity authentication on the first network function network element;
generate a token when determining that the identity authentication succeeds, wherein the token indicates that the first network function network element has the permission to invoke the first network function service of the second network function network element, wherein the token comprises the identifier of the first network function network element, the type of the second network function network element, the identifier of the first network function service, and the identifier of the network slice to which the first network function network element belongs; and
send the token to the first network function network element.

12. The system of claim 11, wherein the program instructions comprised in the first network function network element, when executed by the at least one processor comprised in the first network function network element, cause the first network function network element to:
send a second request message to the second network function network element, wherein the second request message requests to invoke the first network function service provided by the second network function network element, wherein the second request message carries the token,
wherein the token comprises a digital signature;
wherein the system further comprises a second network function network element comprising:
at least one processor; and
a memory coupled to the at least one processor and having program instructions stored thereon which, when executed by the at least one processor, cause the second network function network element to:
verify the digital signature; and
send a service response message to the first network function network element when the digital signature is verified successfully.

13. The system of claim 11, wherein the program instructions comprised in the first network function network element, when executed by the at least one processor comprised in the first network function network element, cause the first network function network element to:
send a second request message to the second network function network element, wherein the second request message requests to invoke the first network function service provided by the second network function network element, wherein the second request message carries the token, wherein the token comprises a message verification code (MAC);
wherein the system further comprises a second network function network element comprising:
at least one processor; and
a memory coupled to the at least one processor and having program instructions stored thereon which, when executed by the at least one processor, cause the second network function network element to:
check the MAC value; and
send a service response message to the first network function network element when the MAC value is checked successfully.

14. The system of claim 11, wherein the program instructions comprised in the first network function network element, when executed by the at least one processor comprised in the first network function network element, cause the first network function network element to:
send a second request message to the second network function network element, wherein the second request message requests to invoke the first network function service provided by the second network function network element, wherein the second request message carries the token, and wherein the token comprises a validity period;
wherein the system further comprises a second network function network element comprising:
a least one processor; and
a memory coupled to the at least one processor and having program instructions stored thereon which, when executed by the at least one processor, cause the second network function network element to:
verify the validity period; and
send a service response message to the first network function network element when the validity period is verified successfully.

15. The system of claim 11, wherein the program instructions comprised in the first network function network element, when executed by the at least one processor comprised in the first network function network element, cause the first network function network element to:
send a second request message to the second network function network element, wherein the second request message requests to invoke the first network function service provided by the second network function network element, and wherein the second request message carries the token;
wherein the system further comprises a second network function network element comprising:
at least one processor; and
a memory coupled to the at least one processor and having program instructions stored thereon which, when executed by the at least one processor, cause the second network function network element to:
verify the type of the second network function network element and the identifier of the network slice included in the token; and
send a service response message to the first network function network element when the type of the second network function network element and the identifier of the network slice are verified successfully.

16. The system of claim 11, wherein the programs instructions comprised in the first network function network element, when executed by the at least one processor comprised in the first network function network element, cause the first network function network element to:
send a second request message to the second network function network element, wherein the second request message requests to invoke the first network function service provided by the second network function network element, wherein the second request message carries the token, and wherein the token further comprises a digital signature and a validity period;

wherein the system further comprises a second network function network element comprising:
   at least one processor; and
   a memory coupled to the at least one processor and having program instructions stored thereon which, when executed by the at least one processor, cause the second network function network element to:
      verify the digital signature;
      verify the type of the second network function network element included in the token, the identifier of the network slice included in the token, and the validity period when the digital signature is verified successfully; and
      send a service response message to the first network function network element when the type of the second network function network element included in the token, the identifier of the network slice included in the token, and the validity period are verified successfully.

17. The system of claim 11, wherein n the program instructions comprised in the first network function network element, when executed by the at least one processor comprised in the first network function network element, cause the first network function network element to:
   send a second request message to the second network function network element, wherein the second request message requests to invoke the first network function service provided by the second network function network element, wherein the second request message carries the token, wherein the second network function network element is configured to send a third request message to the authorization network element in response to receiving the second request message, and wherein the third request message comprises the token;
   the program instructions comprised in the authorization network element, when executed by the at least one processor comprised in the authorization network element, cause the authorization network element to:
      verify validity of the token to obtain a verification result;
      send the verification result to the second network function network element; and
      send a service response message to the first network function network element when the verification result is verified successfully.

18. The system of claim 11, wherein the token further comprises an identifier of an operator providing a service for the first network function network element.

19. The system of claim 18, wherein the identifier of the operator is an identifier of a public land mobile network (PLMN).

20. The system of claim 11, wherein the token comprises an identifier of the authorization network element.

\* \* \* \* \*

UNITED STATES PATENT AND TRADEMARK OFFICE
CERTIFICATE OF CORRECTION

PATENT NO. : 11,218,314 B2
APPLICATION NO. : 16/566018
DATED : January 4, 2022
INVENTOR(S) : Shuaishuai Tan et al.

Page 1 of 1

It is certified that error appears in the above-identified patent and that said Letters Patent is hereby corrected as shown below:

In the Claims

Claim 1, Column 38, Line 44: "perforating, by the authorization" should read "performing, by the authorization"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*